(12) United States Patent
Chen et al.

(10) Patent No.: US 12,453,583 B2
(45) Date of Patent: Oct. 28, 2025

(54) SYSTEMS AND METHODS FOR TRANSPORT AND TISSUE DISTRACTION

(71) Applicant: BioDynamik, Inc., Lake Forest, CA (US)

(72) Inventors: Emmon Johnny Chen, Aliso Viejo, CA (US); Shanbao Cheng, Rancho Santa Margarita, CA (US); Woong Kim, Seattle, WA (US)

(73) Assignee: BioDynamik, Inc., Lake Forest, CA (US)

( * ) Notice: Subject to any disclaimer, the term of this patent is extended or adjusted under 35 U.S.C. 154(b) by 0 days.

(21) Appl. No.: 18/932,397

(22) Filed: Oct. 30, 2024

(65) Prior Publication Data

US 2025/0177007 A1    Jun. 5, 2025

Related U.S. Application Data

(60) Provisional application No. 63/677,610, filed on Jul. 31, 2024, provisional application No. 63/656,900, (Continued)

(51) Int. Cl.
*A61B 17/66* (2006.01)
*A61B 17/00* (2006.01)
(Continued)

(52) U.S. Cl.
CPC .... *A61B 17/66* (2013.01); *A61B 2017/00084* (2013.01); *A61B 2017/00221* (2013.01); (Continued)

(58) Field of Classification Search
None
See application file for complete search history.

(56) References Cited

U.S. PATENT DOCUMENTS 4,730,608 A  *  3/1988  Schlein .................. A61B 17/66
                                                    606/57
5,180,380 A      1/1993  Pursely et al.
(Continued)

FOREIGN PATENT DOCUMENTS

CN         2460057 Y     11/2001
CN       203183002 U      9/2013
(Continued)

OTHER PUBLICATIONS

CN-111529028-A English-language translation (Year: 2020).*
(Continued)

*Primary Examiner* — Julianna N Harvey
(74) *Attorney, Agent, or Firm* — BLAIR WALKER IP SERVICES, LLC

(57) ABSTRACT

A transport device for increasing biological activity within a patient includes a base including a first end, a second end, an upper surface located between the first end and the second end, and a lower surface located between the first end and the second end, a base anchor configured to statically couple the base to a first portion of a bone of a subject, a translatable anchor configured to engage a growth stimulator, a leadscrew dynamically coupling the base to the translatable anchor, wherein the leadscrew is configured to rotate about a leadscrew axis while substantially maintaining its longitudinal position along the leadscrew axis in relation to the base, such that the growth stimulator, when engaged with the translatable anchor, is capable of independent movement in relation to the base along a stimulation axis that includes at least some transverse displacement with respect to the bone when the base is coupled to the bone via the base anchor, and a screw drive rotatably coupled to the leadscrew and configured to couple to a rotatable mating tool that is configured to rotate the leadscrew via the screw drive.

27 Claims, 26 Drawing Sheets

Related U.S. Application Data filed on Jun. 6, 2024, provisional application No. 63/554,970, filed on Feb. 17, 2024, provisional application No. 63/606,038, filed on Dec. 4, 2023.

(51) Int. Cl.
*A61B 17/56* (2006.01)
*A61B 90/00* (2016.01)
*G16H 40/63* (2018.01)
*G16H 40/67* (2018.01)

(52) U.S. Cl.
CPC ............... *A61B 2017/00477* (2013.01); *A61B 2017/564* (2013.01); *A61B 2090/064* (2016.02); *G16H 40/63* (2018.01); *G16H 40/67* (2018.01)

(56) References Cited

U.S. PATENT DOCUMENTS

| | | | |
|---|---|---|---|
| 5,334,202 | A | 8/1994 | Carter |
| 5,980,252 | A | 11/1999 | Samchukov et al. |
| 6,171,313 | B1 | 1/2001 | Razdolsky et al. |
| 8,092,463 | B2 | 1/2012 | Fuchs et al. |
| 8,419,734 | B2 | 4/2013 | Walker et al. |
| 10,130,405 | B2 | 11/2018 | Skinlo et al. |
| 11,925,389 | B2 | 3/2024 | Chang et al. |
| 12,213,708 | B2 | 2/2025 | Cheng et al. |
| 2002/0165544 | A1 | 11/2002 | Perren et al. |
| 2003/0104339 | A1 | 6/2003 | Fromovich et al. |
| 2005/0059864 | A1 | 3/2005 | Fromovich et al. |
| 2005/0074437 | A1 | 4/2005 | Horvath |
| 2005/0159754 | A1 | 7/2005 | Odrich |
| 2005/0159755 | A1 | 7/2005 | Odrich |
| 2005/0209595 | A1 | 9/2005 | Karmon |
| 2006/0058785 | A1 | 3/2006 | Fuchs et al. |
| 2009/0192514 | A1 | 7/2009 | Feinberg et al. |
| 2010/0266979 | A1 | 10/2010 | Karmon |
| 2011/0004199 | A1 | 1/2011 | Ross et al. |
| 2012/0296234 | A1 | 11/2012 | Wilhelm et al. |
| 2014/0222094 | A1 | 8/2014 | Militz et al. |
| 2014/0350558 | A1* | 11/2014 | Triplett ............... A61B 17/6416 606/59 |
| 2015/0133937 | A1 | 5/2015 | Benedict |
| 2015/0223842 | A1 | 8/2015 | Murray et al. |
| 2016/0151099 | A1 | 6/2016 | Olsen et al. |
| 2017/0143387 | A1 | 5/2017 | Jansen |
| 2018/0028231 | A1 | 2/2018 | Singh et al. |
| 2018/0289855 | A1 | 10/2018 | Abdelkader |
| 2019/0175231 | A1 | 6/2019 | Forsell |
| 2019/0290253 | A1 | 9/2019 | Trabish et al. |
| 2021/0307786 | A1 | 10/2021 | Ross et al. |
| 2021/0369287 | A1 | 12/2021 | Boffeli et al. |
| 2022/0022963 | A1 | 1/2022 | Yu et al. |
| 2023/0255665 | A1 | 8/2023 | Pak et al. |
| 2023/0398720 | A1 | 12/2023 | Hipwood et al. |
| 2024/0407807 | A1 | 12/2024 | Ottoboni et al. |

FOREIGN PATENT DOCUMENTS

| | | | | |
|---|---|---|---|---|
| CN | 203873847 | U | 10/2014 | |
| CN | 105167828 | A | 12/2015 | |
| CN | 106108992 | A | 11/2016 | |
| CN | 109907786 | A | 6/2019 | |
| CN | 105286968 | B | 7/2019 | |
| CN | 110200687 | A | 9/2019 | |
| CN | 210056111 | U | 2/2020 | |
| CN | 111053604 | A | 4/2020 | |
| CN | 210277278 | U | 4/2020 | |
| CN | 111529028 | A * | 8/2020 | ....... A61B 17/00234 |
| CN | 211433226 | U | 9/2020 | |
| CN | 211433227 | U | 9/2020 | |
| CN | 111973288 | A | 11/2020 | |
| CN | 112972061 | A | 6/2021 | |
| CN | 213430479 | U | 6/2021 | |
| CN | 113081207 | A | 7/2021 | |
| CN | 113729898 | A | 12/2021 | |
| CN | 216257347 | U | 4/2022 | |
| CN | 216754573 | U | 6/2022 | |
| CN | 113262026 | B | 9/2023 | |
| CN | 116965900 | A | 10/2023 | |
| CN | 117243677 | A | 12/2023 | |
| CN | 109907786 | B | 7/2024 | |
| EP | 2990002 | A1 | 3/2016 | |
| FR | 2653006 | A1 | 4/1991 | |
| WO | WO1999/025265 | A1 | 5/1999 | |
| WO | WO2013/023898 | A1 | 2/2013 | |
| WO | WO2016/154356 | A1 | 9/2016 | |
| WO | WO2017/134486 | A1 | 8/2017 | |
| WO | WO2020/259712 | A1 | 12/2020 | |
| WO | WO2022/238303 | A1 | 11/2022 | |
| WO | WO2024/032985 | A1 | 2/2024 | |
| WO | WO2024/215706 | A1 | 10/2024 | |
| WO | WO2024/251823 | A1 | 12/2024 | |

OTHER PUBLICATIONS

"Discovery and Mechanism of the "Twin Open Skylight and Summon Effects" in Tibial Transverse Transport (TTT)," Weiwei Chen et al., ASAMI-LLRS Beijing Sep. 2024 (1 page).

"Transverse Tibia Transport for the treatment of Diabetic forefoot gangrene: First international case report," Yong Sheng Chen et al., ASAMI-LLRS Beijing Sep. 2024 (2 pages).

"Clinical and Biomechanical Study of Modified Tibial Cortex Transverse Transport on the Treatment of Diabetic Foot," Xiaofang Ding et al., ASAMI-LLRS Beijing Sep. 2024 (2 pages).

"Treatment of Diabetic Foot with Traditional Chinese Medicine Decoction Combined with Tibial Transverse Transport," Xiaohui Gao et al., ASAMI-LLRS Beijing Sep. 2024 (1 page).

"Comparative Study of Tibial Transverse Transport Technique and Free Anterolateral Thigh Perforator Flap for the Repair of Severe Diabetic Foot Ulcers," Shunan Dong et al., ASAMI-LLRS Beijing Sep. 2024 (1 page).

"To comparatively assess the therapeutic efficacy and safety of midshaft and proximal tibial bone transposition in treating diabetic foot ulcers," Haoheng Huang, ASAMI-LLRS Beijing Sep. 2024 (1 page).

"Tibial Cortex Transverse Transport (TTT) promotes diabetic foot ulcers (DFU) healing by mobilizing mesenchymal stem cells (MSCs) through the Sdf 1/CXCR4 axis," Zhaowei Jiang et al., ASAMI-LLRS Beijing Sep. 2024 (2 pages).

"The role of TH17 cell in accelerating diabetic ulcer repair after TTT surgery," Jiakang Jin et al., ASAMI-LLRS Beijing Sep. 2024 (1 page).

"Curative effect of llizarov tibial lateral bone transfer technique combined with recombinant human epidermal growth factor in the treatment of diabetic foot," Jing Liao, ASAMI-LLRS Beijing Sep. 2024 (1 page).

"Mechanism Study on Tibial Transverse Transport Facilitating Bone and Vascular Coupling through H-Type Vessels," Zhanming Lin, ASAMI-LLRS Beijing Sep. 2024 (1 page).

"Clinical observation of tibial transverse bone transfer technique in the treatment of diabetic foot," Jing Liu, ASAMI-LLRS Beijing Sep. 2024 (1 page).

"Tibial Cortex Transverse Transport: A Novel Treatment of Large Area of Deep Wounds in the Patient's Lower Extremities," Xinyu Nie et al., ASAMI-LLRS Beijing Sep. 2024 (2 pages).

"Finite Element Analysis Safety of Tibial Cortex Transverse Transport," Hongjie Su et al., ASAMI-LLRS Beijing Sep. 2024 (1 page).

"Nursing Care of Patients with Diabetic Foot Wound Treated by Tibial Transverse Transport," Hua Wang et al., ASAMI-LLRS Beijing Sep. 2024 (1 page).

"Treatment of Complications of Tibial Transverse Transport," Hua Wang et al., ASAMI-LLRS Beijing Sep. 2024 (1 page).

"The application effect of the OTO whole-process management model in the treatment of diabetic foot patients with transverse tibial bone transfer," Tian Yan, ASAMI-LLRS Beijing Sep. 2024 (1 page).

(56) References Cited

OTHER PUBLICATIONS

"Observation on the curative effect of fibula transverse transport technique in the treatment of diabetic foot ulcer," Zirui Yu, ASAMI-LLRS Beijing Sep. 2024 (1 page).
"Tibial cortex transverse transport surgery activates a systemic immune response against infection to promote wound healing in patients with severe type 2 DFUs," Lin Yu, ASAMI-LLRS Beijing Sep. 2024 (1 page).
"Tibial transverse transport for treatment of diabetic foot accompanied with diabetic nephropathy," dapeng Yu, ASAMI-LLRS Beijing Sep. 2024 (1 page).
"Reconstruction of foot microvasculature after transverse tibial bone transport," Yonghong Zhang et al., ASAMI-LLRS Beijing Sep. 2024 (1 page).
"Lateral Traction of the Tibial Periosteum in the Management of Chronic Ischemic Lower Limb Diseases," Naxin Zeng et al., ASAMI-LLRS Beijing Sep. 2024 (1 page).
"Clinical analysis of the therapeutic effect of tibial transverse bone transport in the treatment of diabetic foot ulcer," Dingwei Zhang, ASAMI-LLRS Beijing Sep. 2024 (1 page).
"Prognostic Value of IL-6 and Related Cytokines in Angiogenesis Following Transverse Tibial Transplantation for Diabetic Foot Ulcers," Dingwei Zhang, ASAMI-LLRS Beijing Sep. 2024 (1 page).
"\Clinical experience of transverse tibial displacement in the treatment of ulcers after great saphenous varicose vein surgery," Yuhua Zhao, ASAMI-LLRS Beijing Sep. 2024 (1 page).
"The association of the perioperative neutrophil-to-lymphocyte ratio with wound healing in patients with Wagner grade 3 and 4 diabetic foot ulcers after tibial cortex transverse transport surgery: A prospective observational cohort study," Sichun Zhao et al., ASAMI-LLRS Beijing Sep. 2024 (2 pages).
"Simulated finite element analysis of the effect of tibial cortex transverse transport on tibial mechanics in rats," Puxiang Zhen et al., ASAMI-LLRS Beijing Sep. 2024 (1 page).
"Tibial periosteal distraction in chronic limb threatening ischemia," Peilin Zhou, ASAMI-LLRS Beijing Sep. 2024 (1 page).
"Interventional therapy combined with transverse tibial bone transport for the treatment of severe ischemic ulcer of the lower limbs in elderly patients," Jieyi Zuo et al., ASAMI-LLRS Beijing Sep. 2024 (1 page).
Operaive Technique. LRS Advanced™. Limb Reconstruction, Orthofix Orthopedics. LR-0901-OPT-E0 02/22 (424935) (52 pages) Available on internet Sep. 25, 2024.
"Transverse Kallusdistraktion. Neue Chancen für den Extremitätenerhalt?" Thaller PH et al., Unfallchirurg 2022 · 125:282-287 https://doi.org/10.1007/s00113-022-01156-1 Published online Mar. 17, 2022.
"Tibial Cortex Transverse Transport Corticotomy: A Case Series on a Novel Approach to Limb Salvage in the Setting of Peripheral Vascular Disease," Matthew A. Peter et al., Foot & Ankle Surgery: Techniques, Reports & Cases (2024) https://doi.org/10.1016/j.fastrc.2024.100420 (21 pages).
Bfix External Fixation System. Aike Medical Instrument CO Ltd. (16 pages) Available on internet Sep. 20, 2024.

BFIX External Fixator System. ENDO website (1 page) Available on internet Sep. 20, 2024 endo.id/catalog/product/bfix-external-fixator-system.
"Periosteal distraction for foot preservation contributes to favorable clinical effects and prognosis in a foot ulcer patient with critical limb ischemia after multiple operations," Junjun Wang et al., Am J Transl Res 2023; 15(5):3766-3772 www.ajtr.org /ISSN: 1943-8141/ AJTR0150065.
"Periosteum distraction for the treatment of diabetic foot ulcer: theoretical basis and clinical verification (Chinese)," Liu Jie et al., Chinese Journal of Tissue Engineering Research, 2095-4344(2022)32— pp. 5236-5241 www.CJTER.com.
"Analysis of the short-term efficacy of tibial periosteal distraction in the treatment of diabetic foot (Chinese)," Chen et al., Johrnal of Practical Orthopaedics, vol. 28, No. 8, Aug. 2022 (5 pages, in 2 separate pdfs because of file size limits).
"Mechanical strain induces ex vivo expansion of periosteum," Mary M. Walker et al., PLoS One 17(12): e0279519. https://doi.org/10.1371/journal.pone.0279519 Dec. 30, 2022.
Periosteum distraction case study (Chinese), Chinese Journal of Clinical Research, Aug. 2023, vol. 36, No. 8, pp. 1264-1266.
Maxframe Autostrut™ Multi-Axial Correction System. DePuy Synthes. (4 pages) 2022.
"Effect of tibial cortex transverse transport in patients with recalcitrant diabetic foot ulcers: A prospective multicenter cohort study," Yan Chen et al., Journal of Orthopaedic Translation 36 (2022) pp. 194-204.
"Twenty Years Development of Tibial Cortex Transverse Transport Surgery in PR China," Zheng Liu et al., Orthopedic Surgery (2022) 14: 1034-1048.
"Clinical and Mechanistic Study of Transverse Tibial Transport in Complex Foot Ulcers," Samuel KK Ling reporting, https://www.clinicaltrials.gov/study/NCT05704075?cond=diabetic%20foot%20ulcer&term=tibial%20transport&rank=1#study-overview Available on internet Jan. 23, 2024.
"Comparison of the efficacy of tibial transverse transfer and periosteal distraction techniques in the treatment of diabetic foot refractory ulcers," Yang Yang et al., Frontiers in Surgery, 11:1396897. doi: 10.3389/fsurg.2024.1396897 (11 pages, in three separate pdfs because of file size limits).
"Transverse tibial bone transport for non-healing heel wound: A case report," Ally A. Yang et al., International Journal of Surgery Case Reports, 124 (2024) https://doi.org/10.1016/j.ijscr.2024.110400.
"Transverse Bone Transport for the Treatment of Dysvascular Complex Wounds of the Foot: A Case Series," Lisa Grant-McDonald et al., Scientific Congress of the American College of Foot and Ankle Surgeons, Feb. 1-2, 2024 (2 pages).
Orthofix Press Release, available on the internet Jan. 25, 2025 (2 pages).
PCT International Search Report and Written Opinion for PCT/US2024/058493, Applicant: Biodynamik, Inc., Forms PCT/ISA/220, 210, and 237 dated Apr. 1, 2025 (30 pages).

* cited by examiner

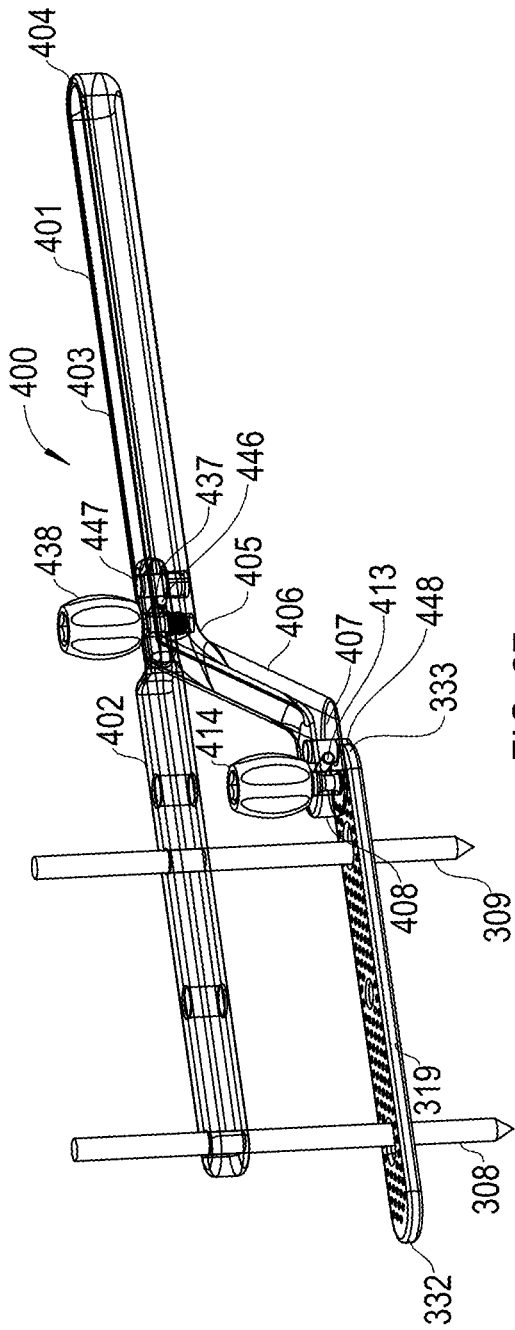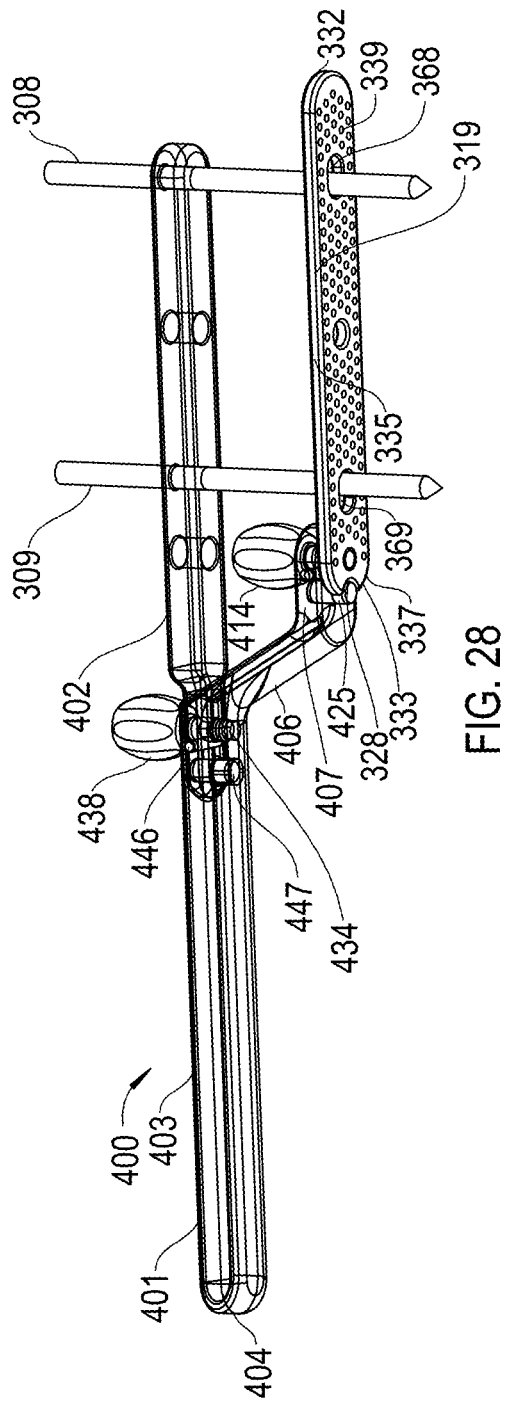

SYSTEMS AND METHODS FOR TRANSPORT AND TISSUE DISTRACTION

INCORPORATION BY REFERENCE TO ANY PRIORITY APPLICATIONS

This application claims the benefit of priority to U.S. Provisional Patent Application No. 63/606,038, filed on Dec. 4, 2023, U.S. Provisional Patent Application No. 63/554,970, filed on Feb. 17, 2024, U.S. Provisional Patent Application No. 63/656,900, filed on Jun. 6, 2024, and U.S. Provisional Patent Application No. 63/677,610, filed on Jul. 31, 2024. Priority is claimed pursuant to 35 U.S.C. § 119.

The following U.S. Provisional Patent applications are hereby incorporated by reference in their entirety for all purposes: U.S. Provisional Patent Application No. 63/554,970, filed on Feb. 17, 2024, U.S. Provisional Patent Application No. 63/656,900, filed on Jun. 6, 2024, and U.S. Provisional Patent Application No. 63/677,610, filed on Jul. 31, 2024.

BACKGROUND OF THE INVENTION

Field of the Invention

This invention relates to devices and methods for distracting a bone cortex or bone segment, or soft tissues such as periosteum, for transverse transport or tissue stretching, and more specifically to devices and methods for internal or external application of transverse transport (TT) for increasing blood flow and inducing tissue and/or bone regeneration. Transverse transport (TT) includes tibial cortex transverse transport (TTT), or transverse transport of other bone pieces, and/or periosteal distraction (PD) or other stretching.

SUMMARY OF THE INVENTION

In one embodiment of the present disclosure, a system for increasing biological activity within a patient includes a housing, a drive carried within the housing, an indexing contour carried by the housing and configured to substantially stabilize the housing in relation to a transport device base of a transport device configured to move a growth stimulator in relation to a bone of a subject, a locking portion configured to releasably lock the housing to the transport device base, a rotatable mating tool carried by the housing, wherein the drive is configured to cause the rotatable mating tool to rotate, and wherein the rotatable mating tool is configured to be rotationally coupled to a screw drive of a leadscrew of the transport device when the housing is stabilized with the transport device base via the indexing contour and is locked to the transport device base via the locking portion, and a control unit configured to output a control signal configured to direct the drive to rotate the rotatable mating tool.

In another embodiment of the present disclosure, a method for increasing biological activity within a patient includes, providing a system including a housing, a drive carried within the housing, an indexing contour carried by the housing and configured to substantially stabilize the housing in relation to a transport device base of a transport device configured to move a growth stimulator in relation to a bone of a subject, a locking portion configured to releasably lock the housing to the transport device base, a rotatable mating tool carried by the housing, wherein the drive is configured to cause the rotatable mating tool to rotate, and wherein the rotatable mating tool is configured to be rotationally coupled to a screw drive of a leadscrew of the transport device when the housing is stabilized with the transport device base via the indexing contour and is locked to the transport device base via the locking portion, and a control unit configured to output a control signal configured to direct the drive to rotate the rotatable mating tool, surgically securing the transport device base to the bone of the subject, surgically placing the growth stimulator within the patient and coupling the growth stimulator to the transport device base such that it is displaceable relative to the transport device base via rotation of the leadscrew, engaging the indexing contour of the housing with the transport device base, locking the housing to the transport device base via the locking portion, coupling the rotatable mating tool to the screw drive of the leadscrew, and initiating the control signal to cause the rotatable mating tool rotate the leadscrew and to displace the growth stimulator in relation to the bone of the subject.

In still another embodiment of the present disclosure, a transport device for increasing biological activity within a patient includes a base including a first end, a second end, an upper surface located between the first end and the second end, and a lower surface located between the first end and the second end, a base anchor configured to statically couple the base to a first portion of a bone of a subject, a translatable anchor configured to engage a growth stimulator, a leadscrew dynamically coupling the base to the translatable anchor, wherein the leadscrew is configured to rotate about a leadscrew axis while substantially maintaining its longitudinal position along the leadscrew axis in relation to the base, such that the growth stimulator, when engaged with the translatable anchor, is capable of independent movement in relation to the base along a stimulation axis that includes at least some transverse displacement with respect to the bone when the base is coupled to the bone via the base anchor, and a screw drive rotatably coupled to the leadscrew and configured to couple to a rotatable mating tool that is configured to rotate the leadscrew via the screw drive.

In yet another embodiment of the present disclosure, a method for increasing biological activity within a patient includes providing a transport device including a base including a first end, a second end, an upper surface located between the first end and the second end, and a lower surface located between the first end and the second end, a base anchor configured to statically couple the base to a first portion of a bone of a subject, a translatable anchor configured to engage a growth stimulator, a leadscrew dynamically coupling the base to the translatable anchor, wherein the leadscrew is configured to rotate about a leadscrew axis while substantially maintaining its longitudinal position along the leadscrew axis in relation to the base, such that the growth stimulator, when engaged with the translatable anchor, is capable of independent movement in relation to the base along a stimulation axis that includes at least some transverse displacement with respect to the bone when the base is coupled to the bone via the base anchor, and a screw drive rotatably coupled to the leadscrew and configured to couple to a rotatable mating tool that is configured to rotate the leadscrew via the screw drive, surgically securing the base anchor to the bone of the subject, surgically coupling the translatable anchor to the growth stimulator within the subject, coupling the rotatable mating tool to the screw drive of the leadscrew, and causing the leadscrew to rotate via the rotatable mating tool to displace the translatable anchor in relation to the base and to cause the growth stimulator to move with at least a transverse directional component in relation to the bone of the subject.

BRIEF DESCRIPTION OF THE DRAWINGS

FIG. 27 is a first perspective view of a periosteal distraction device connected to an insertion tool, according to an embodiment of the present disclosure.

FIG. 28 is a second perspective view of a periosteal distraction device connected to an insertion tool, according to an embodiment of the present disclosure.

DETAILED DESCRIPTION OF THE ILLUSTRATED EMBODIMENTS

Figure 1:
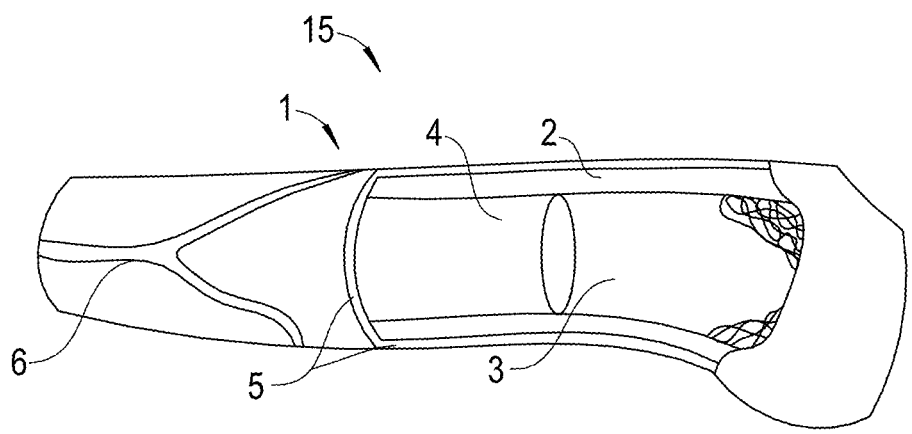
FIG. 1 is a perspective view of the anatomy of a tibia of a patient.

Distraction osteogenesis (DO) or distraction histogenesis (DH), provides a method for repairing complex bone fractures using an external or internal fixation apparatus that applies a slow, steady, continuous distraction to living tissue to stimulate local tissue regeneration and active growth. Periosteal distraction osteogenesis (PDO) or periosteal distraction histogenesis (PDH) use the osteogenicity of periosteum, which creates an artificial space between the bone surface and periosteum to generate new bone by gradually expanding the periosteum. This can be done without requiring any corticotomy. Periosteal distraction osteogenesis (PDO) or periosteal distraction histogenesis (PDH) can induce new bone formation, and can also effectively increase blood flow, guide tissue generation, and augment soft tissue. Periosteal distraction (PD) is a broad name for the technology and medical technique.

Soft tissue pressure injuries are a major health problem with high morbidity, high burden to healthcare, and increased mortality rates. The inventors have recognized that the distraction of the tibial cortex and stretching of the periosteum each via transverse tibial transport (TTT) and periosteal distraction (PD) each result in an increase of regenerative growth factors and stem cell serum levels, with positive effects observed on angiogenesis and blood flow on the non-treated limb. These techniques can also raise systemic growth factor levels. They can also increase perfusion and microvascularization. The inventors have developed devices and procedures that provide safer, less and/or non-invasive procedures with improved management during transverse tibial cortex transport (TTT) treatment to make available effective therapies to alleviate the suffering of patients having a wide range of medical conditions arising from circulation impairment and/or bone injury/deformity.

The inventors have also developed apparatus and methods for making and using various devices for moving bone materials and related materials at a variety of sites in the body. The applications include many in which growth such as angiogenesis or nerve generation is desirable and can be achieved. A large number of patients can benefit from such apparatus and techniques, including patients having diabetes. Effective therapies are thus made possible to alleviate the suffering of patients having a wide range of medical conditions arising from circulation impairment and/or bone injury/deformity.

In some embodiments, a device is similar to a trauma plate, but has actuating members that can controllably (automatically or semi automatically) move a bone fragment and induce distraction osteogenesis or distraction histogenesis, either invasively or non-invasively. The fixed portion of the device allows for fixation into the bone using anchors, such as bone anchors like fixation pins or locking screws, while the articulating member of the device also uses locking screws to provide fixation to the intercalary segment in order to control its movement. The embodiments of the device allow the TTT or PD fixation construct to be located internally. The technique need not use a tibia as the main bone, or a piece of tibial bone. Other bones can be utilized, including, but not limited to: a mandible, a clavicle, a humerus, a radius, an ulna, a femur, a fibula, an ilium, a phalange, a tibia, and a sacrum.

The implant has an internal actuator and drive mechanism to move the articulating members of the device. The cortex distraction element moves perpendicularly away from the fixed main body of the device. In some embodiments, in addition to perpendicular movement, a hinge-type opening angle type of actuation can also achieve distraction osteogenesis or distraction histogenesis. The member is controlled by rotation of output shaft of the actuator or through the gears on the shaft.

The torque output from the motor, or magnet, can be multiplied using an offset flat spur gear chain system, which allows the resulting amplified output torque to rotate a leadscrew or ball screw and nut element to allow a threaded mechanical interaction that converts rotational motion to linear movement. The torque output from the motor, or magnet, can be multiplied with worm gearing (worm drive), for example a worm engaging a worm wheel.

While useful for patient needs involving application of a device to the tibia for diabetic foot ulcer treatment, the inventive devices and techniques can also be used for any bone on the body, as the scientific principles of distraction osteogenesis or distraction histogenesis apply for all bones in the body. The inventors have recognized that it is possible that the distraction of the tibial cortex results in an increase of regenerative growth factors and stem cell serum levels, with positive effects observed on angiogenesis and blood flow on the non-treated limb. This technique can raise systemic growth factor levels, which may also be experienced in proximity of the distraction osteogenesis or distraction histogenesis site. Embodiments of the devices described herein can be coupled to many different bones in the body, because the devices are internal and implantable, allowing targeted treatment of soft tissue injuries in virtually any area of the body. For example, a patient presenting with sacral pressure ulcers could receive this technique and device in the pelvis which could localize the accelerated biologic activity.

The utility of the devices and techniques described herein is not necessarily limited to pressure ulcers but could be used to treat any soft tissue like primary lymphedema or injuries, including burns or acute traumatic injuries which would normally require the use of skin grafts. The use of this device could also be used for the healing of vascular or nerve grafts. Further, it should be noted that while many examples described herein specifically refer to TTT, i.e., transverse tibial cortex transport, PD, i.e., periosteal distraction, the inventive devices and methods are applicable to a broad range of other therapies, including but not limited to, horizontal ipsilateral bone transport for treating segmental bone defects.

FIG. 1 illustrates a partially dissected tibia portion 1 of a patient 15 comprising an outer cortex 2 comprising hard, cortical bone and a medullary cavity 3. The anatomy of the tibia 1 includes many characteristics that can be found in a range of bones in the human body. Marrow 4 fills the medullary cavity 3. A periosteum 5, is a tissue layer that adheres to an outer surface of the tibia 1, as it does in most bones in the body. A network of blood vessels 6 include arteries that supply blood to the tibia 1 including the medullary cavity 3 and veins that provide a pathway for exiting blood. Many of these blood vessels 6 are not shown in FIG. 1 because they are in the cut-away portion.

Figure 2:
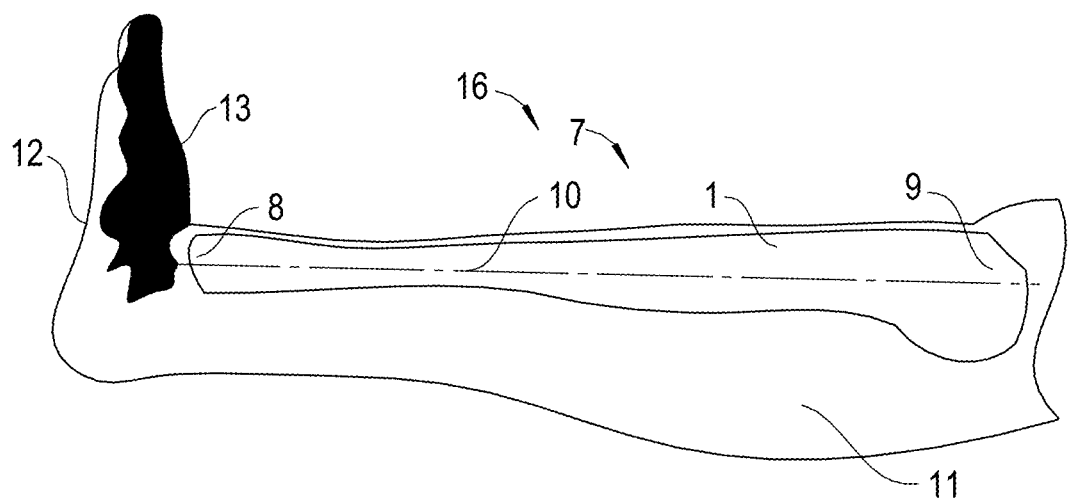
FIG. 2 is a side view of a lower leg of a patient suffering from a diabetic foot ulcer.

FIG. 2 illustrates a lower leg 7 of a diabetic patient 16, demonstrating that the tibia 1 comprises a distal end 8 and a proximal end 9 and generally extends along a longitudinal axis 10. The calf 11 area and foot 12 are also shown, the foot 12 in this particular patient 61 having a diabetic foot ulcer 13. Foot ulcers 13 are found in approximately 15% of diabetic patients. Diabetic foot ulcers 13 are the most common cause of lower extremity amputations that are not caused by trauma, with amputation being required in between 14% to 24% of patients having diabetic foot ulcers 13. Treatment in the related bones of diabetic patients having foot ulcers, or in the process of developing foot ulcers, or other similar ulcers, can be initiated with one or more of the embodiments presented herein. Diabetic foot ulcers are only one type of ischemic foot ulcers. The embodiments described herein are all configured to treating all types of ischemic foot ulcers, not only those caused and/or exacerbated by diabetes. Ischemic foot ulcers can also be caused by one or more of: atherosclerosis, arteriosclerosis, peripheral artery disease (PAD) caused by hyperlipidemia, hypertension, smoking, chronic kidney disease, lupus, and even badly-healed trauma with or without underlying conditions like alcoholism, bad stress management, cancer, concurrent radiation therapy, or autoimmune diseases.

Figure 3:
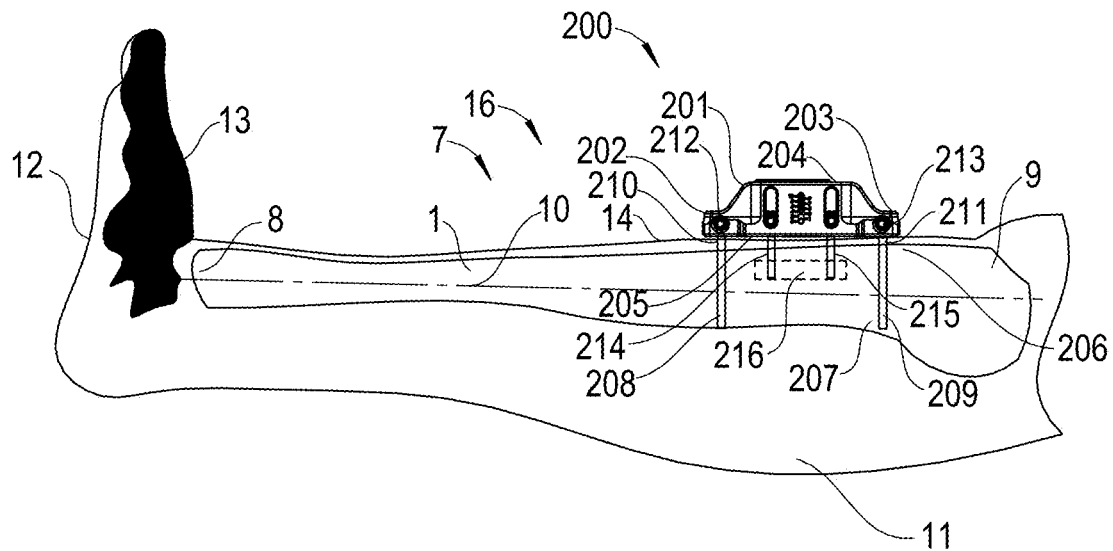
FIG. 3 illustrates a transverse tibia transport device in a first position in use, according to an embodiment of the present disclosure.
Figure 4:
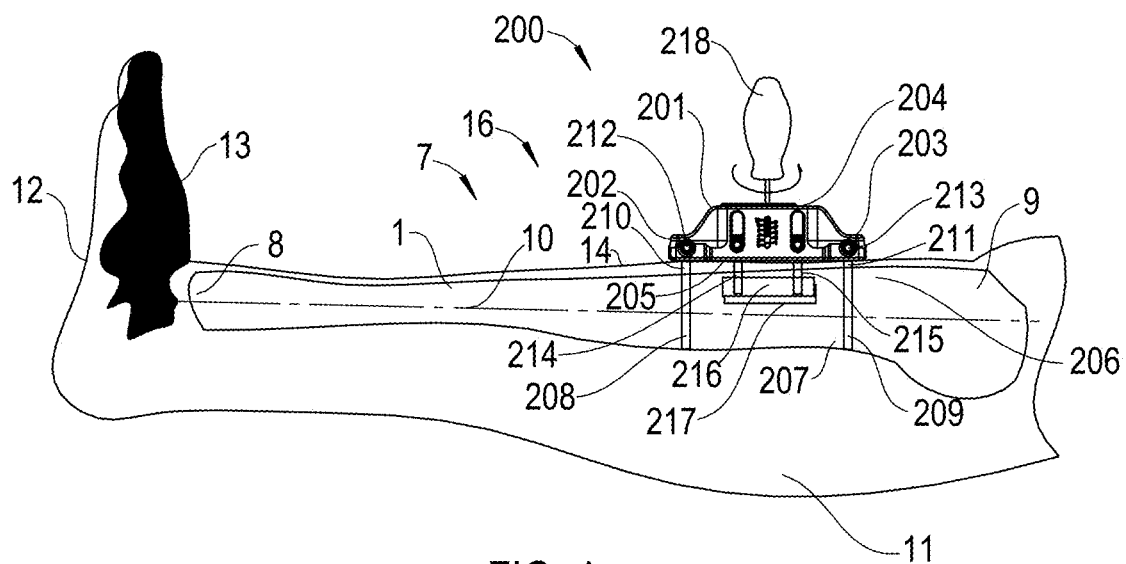
FIG. 4 illustrates a transverse tibia transport device in a second position in use, according to an embodiment of the present disclosure.

FIGS. 3-4 illustrate a transverse tibia transport device (TTT device) 200 coupled to a tibia 1 of a patient 16 having a foot ulcer 13. The TTT device 200 comprises a base 201 having a first end 202, and second end 203, an upper surface 204, and a lower surface 205. The upper surface 204 and the lower surface 205 each extend between the first end 202 and the second end 203. In FIGS. 3-4, the base 201 has been coupled such that it is external to the skin 14 surrounding the lower leg 7, with the first end 202 pointing toward the distal end 8 of the tibia 1 and the second end 203 pointing toward the proximal end 9 of the tibia 1.

The base 201 is statically coupled to cortical bone at a first side 206 of the tibia 1 and a second side 207 of the tibia 1 with bone anchors 208, 209, which can comprise bone screws. The bone anchors 208, 209, at first ends 210, 211, are statically coupled to the base 201 by securing the first ends 210, 211 with set screws 212, 213, respectively. In a first type of setup, the base 201 can be coupled to the tibia 1 via the bone anchors 208, 209 such that the lower surface 205 of the base 201 contacts and rests against the skin 14. In second type of setup, a protective material, such as cotton gauze (not shown) is sandwiched between the lower surface 205 of the base 201 and the skin 14. In a third type of setup, a space is maintained between the lower surface 205 of the base 201 and the skin 14. The space can be between 0.05 mm and 30 mm, or between 1 mm and 20 mm, or between 2 mm and 10 mm.

A movable stage 219 (FIGS. 8-9 and 14-16) will be described in more detail. The movable stage 219 is internal to the base 201 and movable relative to the base 201 via a rotatable leadscrew 274 (FIGS. 7-9 and 13-16) that is longitudinally constrained within the base 201. In some embodiments, substantially all of the leadscrew 274 is longitudinally maintained between the upper surface 204 and the lower surface 205 of the base 201. The movable stage 219 is statically coupled to two dynamic (movable) bone anchors 214, 215. A piece 216 of the tibia 1 is cut from the tibia 1 such that it can be moved independently of the tibia, e.g., underneath the periosteum 5. This leaves an open space 217 in the tibia 1. The dynamic bone anchors 214, 215 are each statically coupled to the piece 216 of the tibia. The bone anchors 208, 209 and the dynamic bone anchors 214, 215 pass through the skin 14 of the patient 16. Access through the skin can be created by the user via a number of surgical methods, such as incision or puncture, with one or more surgical tools, or with the bone anchors 208, 209, 214, 215, themselves. Using a torque tool, such as a screwdriver 218, a head of the leadscrew 274 is engaged and rotated in a first rotational direction (arrow, FIG. 4) causing the stage 219 to move relative to the base 201 and in turn translating the dynamic bone anchors 214, 215 that are attached to the piece 216 that was cut from the tibia 1. By movement of this piece 216 of the tibia 1 in a direction that includes a transverse component in relation to the longitudinal axis 10 of the tibia 1, the growth-related stimulation can occur, including an increase of regenerative growth factors and systemic growth factors, stem cell serum levels, angiogenesis, and blood flow on the treated lower leg, and systemically. Though two bone anchors 208, 209 and two dynamic bone anchors 214, 215 are represented, other embodiments utilizing only one bone anchor 208 and/or only one dynamic bone anchor 214 are also possible. By having sufficient diameter or transverse dimension (if not round in cross-section) for reduced bending, a single anchor 208, 214 can stabilize the base 201 in relation to the tibia 1 and stabilize the bone portion 216 in relation to the movable stage 219.

Figure 5:
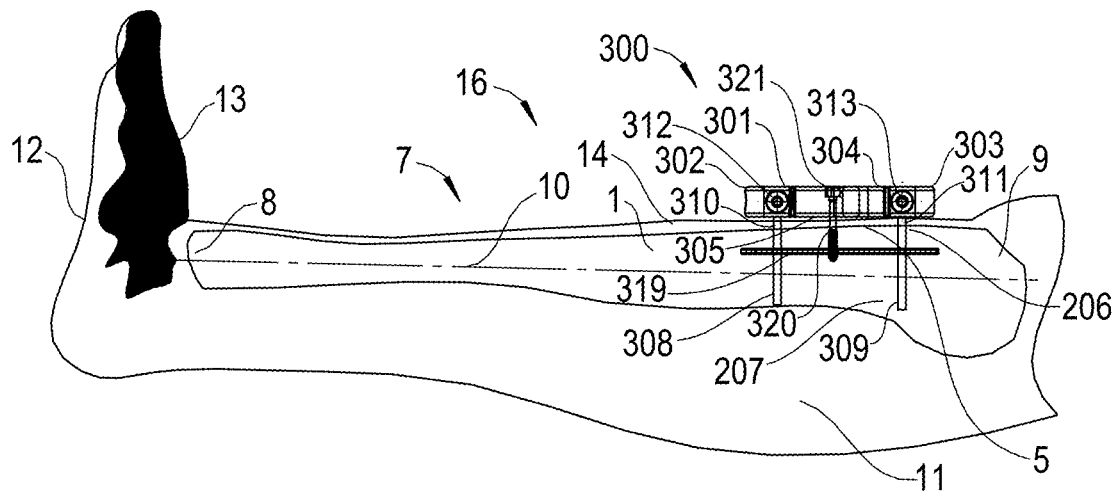
FIG. 5 illustrates a periosteal distraction device in a first position in use, according to an embodiment of the present disclosure.
Figure 6:
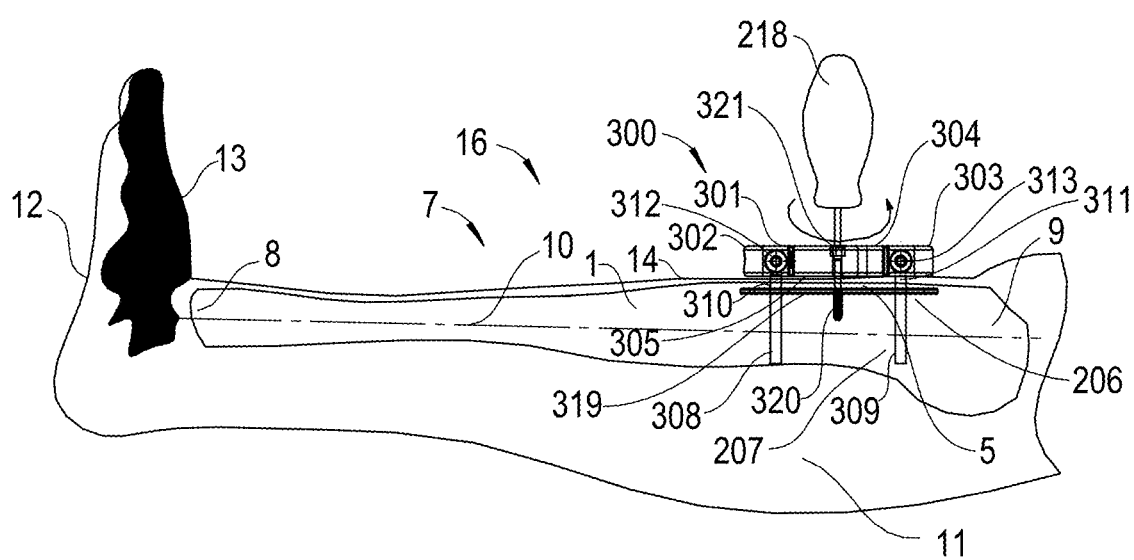
FIG. 6 illustrates a periosteal distraction device in a second position in use, according to an embodiment of the present disclosure.

FIGS. 5-6 illustrate a periosteal distraction device (PD device) 300, or periosteal stretching device, coupled to a tibia 1 of a patient 16 having a foot ulcer 13. The PD device 300 comprises a base 301 having a first end 302, and second end 303, an upper surface 304, and a lower surface 305. The upper surface 304 and the lower surface 305 each extend between the first end 302 and the second end 303. In FIGS. 5-6, the base 301 has been coupled such that is external to the skin 14 surrounding the lower leg 7, with the first end 302 pointing toward the distal end 8 of the tibia 1 and the second end 303 pointing toward the proximal end 9 of the tibia 1. The base 301 comprises anodized aluminum, or another high-strength material.

The base 301 is statically coupled to cortical bone at a first side 206 of the tibia 1 and a second side 207 of the tibia 1 with bone anchors 308, 309, which can comprise bone screws. The bone anchors 308, 309, are statically coupled to the base 301 by securing the bone anchors 308, 309 with set screws 312, 313, respectively. In a first type of setup, the base 301 can be coupled to the tibia 1 via the bone anchors 308, 309 such that the lower surface 305 of the base 301 contacts and rests against the skin 14. In a second type of setup, a protective material, such as cotton gauze (not shown) is sandwiched between the lower surface 305 of the base 301 and the skin 14. In a third type of setup, a space is maintained between the lower surface 305 of the base 301 and the skin 14. The space can be between 0.05 mm and 30 mm, or between 1 mm and 20 mm, or between 2 mm and 10 mm.

A movable stage 319, comprising a plate, movable relative to the base 301 via a rotatable leadscrew 320 that is longitudinally constrained within the base 301. The movable stage 319 is implanted beneath a section of periosteum 5 of the patient 16. The movable stage 319 includes two holes 322, 323 configured to allow the bone anchors 308, 309 to pass through, with clearance, thus allowing the movable stage 319 to translate in relation to the bone anchors 308, 309. The bone anchors 308, 309 and the leadscrew 320 pass through the skin 14 of the patient 16. Using a torque tool, such as a screwdriver 218, a head 321 of the leadscrew 320 is engaged and rotated in a first rotational direction (arrow, FIG. 6) causing the stage 319 to move relative to the base 301 and in turn moving, distracting, and/or stretching the periosteum 5 away from the tibia 1. By rotating the leadscrew 320 in the opposite rotational direction (opposite the arrow in FIG. 6), the stress applied to the periosteum 5 is reduced. By movement of the periosteum 5 of the tibia 1 in a direction that includes a transverse component in relation to the longitudinal axis 10 of the tibia 1, the growth-related stimulation can occur, including an increase of regenerative growth factors and systemic growth factors, stem cell serum levels, angiogenesis, and blood flow on the treated lower leg, and systemically. In some embodiments, the leadscrew 320 and the movable stage each comprise stainless steel. In some embodiments, the movable stage is a length of between about 30 mm and about 100 mm, or between about 40 mm and about 80 mm, or between about 30 mm and about 50 mm, or between about 60 mm and about 100 mm, or between about 70 mm and about 90 mm, or about 80 mm. In some embodiments, the movable stage is a width of between about 5 mm and about 20 mm, or between about 8 mm and about 15 mm, or between about 8 mm and about 12 mm, or between about 9 mm and about 11 mm, or about 10 mm. In some embodiments, the movable stage 319 is substantially circle-shaped, and has a diameter of between 1 mm and 100 mm, or between 5 mm and 50 mm.

FIGS. 7-12 illustrate details of the transverse tibia transport device (TTT device) 200. The base 201 comprises a first end 202, and second end 203, an upper surface 204, and a lower surface 205. The upper surface 204 and the lower surface 205 each extend between the first end 202 and the second end 203. The base 201 includes a central extended portion 224 having a substantially planar top area 226 of the upper surface 204, extending between a first fillet 225 and a second fillet 227 of the upper surface 204. The central extended portion 224 comprises a central translation cavity 228 having a generally oval shape. In other embodiments, the central translation cavity 228 can have a shape that is rectangular, square, or circular. A movable stage 219 has a substantially matching oval shape with the translation cavity 228, but with slightly smaller dimensions, and is configured to translate, with clearance, up and down within the translation cavity 228. The movable stage 219 comprises an upper surface 230 (FIG. 9), a lower surface 231 (FIG. 8), a first end 232, a second end 233, a front face 234, and a back face 235. The first end 232 comprises a first semi-cylindric face 236, and the second end 233 comprises a second semi-cylindric face 237. The translation cavity 228 is bounded by a planar front wall 238 (FIG. 11) having a central, vertically-extending window 239 (FIG. 8) and two vertically-extending access apertures 240, 241, one on each side of the vertically-extending window 239.

The base 201 further comprises a front face 242, a back face 243, a first reduced-thickness end portion 244, and a second reduced-thickness end portion 245. A first curvilinear transition portion 246 extends between a first upper portion 248 of the upper surface 204 and an angled portion 250 of the upper surface 204. A second curvilinear transition portion 247 extends between a second upper portion 249 of the upper surface 204 and an angled portion 251 of the upper surface 204. The upper surface 204 further comprises a raised access area 252. Bone anchors 208, 209, at first ends 210, 211, are statically coupled to the base 201 by securing the first ends 210, 211 with set screws 212, 213, respectively. The base 201 comprises a first female-threaded hole 253 configured to threadingly engage a male thread 255 of the first set screw 212, and a second female-threaded hole 254 configured to threadingly engage a male thread 256 of the second set screw 213. The set screws 212, 213 each comprise an engagement tip (not shown) for frictionally engaging the bone anchors 208, 209, and a screw drive 257, 258 for keyingly engaging a drive tip of a torque tool, such as a screwdriver or a motorized driver. The screw drives 257, 258 can comprise any non-circular cavity shape, but can alternatively comprise a non-circular protrusion/protuberance. The non-circular shape of the screw drives 257, 258 can comprise any one of a hex, a torx, a slot, a Phillips or other X-shape or cruciform shape, a Robertson or other square shape, a security or tamper-resistant shape, an oval, a spanner, a pentalobular, a tri-point, a multiple square, or any combination thereof.

The first reduced-thickness end portion 244 includes a vertically-extending hole 261 passing therethrough, and the second reduced-thickness end portion 245 includes a vertically-extending hole 262 passing therethrough. The holes 261, 262 are sized to allow the bone anchors 208, 209 to be passed therethrough. The movable stage 219 comprises a first vertically-extending hole 259 and a second vertically-extending hole 260, passing therethrough. The holes 261, 262 are sized to allow the bone anchors 208, 209 to be passed therethrough. The holes 259, 260 of the movable stage 219 are sized to allow two dynamic (movable) bone anchors 214, 215 to be passed therethrough. The movable stage 219 comprises a first female-threaded hole 267 configured to threadingly engage a male thread 268 of a first set screw 265, and a second female-threaded hole 269 configured to threadingly engage a male thread 270 of a second set screw 266. The set screws 265, 266 each comprise an engagement tip (not shown) for frictionally engaging the dynamic bone anchors 214, 215, and a screw drive 271, 272 for keyingly engaging a drive tip of a torque tool, such as a screwdriver or a motorized driver. The screw drives 271, 272 can comprise any non-circular cavity shape, but can alternatively comprise a non-circular protrusion/protuberance. The non-circular shape of the screw drives 271, 272 can comprise any one of a hex, a torx, a slot, a Phillips or other X-shape or cruciform shape, a Robertson or other square shape, a security or tamper-resistant shape, an oval, a spanner, a pentalobular, a tri-point, a multiple square, or any combination thereof. There are two additional holes 263, 264 at the central extended portion 224 of the base 201 that are configured to allow the dynamic bone anchors 214, 215 to translate freely therein.

In use, a user drives the bone anchors 208, 209 into the desired bone (e.g., tibia) for static engagement, and drives the dynamic bone anchors 214, 215 into a bone piece 216 or other growth stimulator for static engagement. With the movable stage 219 located within the translation cavity 228 of the base 201, the bone anchors 208, 209 inserted through the holes, and the user secures the bone anchors 208, 209 to the base 201 by tightening the set screws 212, 213 against the bone anchors 208, 209, to frictionally hold them in relation to the base 201. When placing the base 201 over the bone anchors 208, 209 with the movable stage 219 in place within the translation cavity 228, the dynamic anchors 214, 215 will have passed freely through the holes 259, 260 in the movable stage 219 and the holes 263, 264 of the base 201. The user then adjusts the height of the movable stage 219 within the translation cavity 228 of the now secured base 201, and then tightens the set screws 265, 266 against the dynamic bone anchors 214, 215, to frictionally hold them in relation to the movable stage 219.

Figure 12:
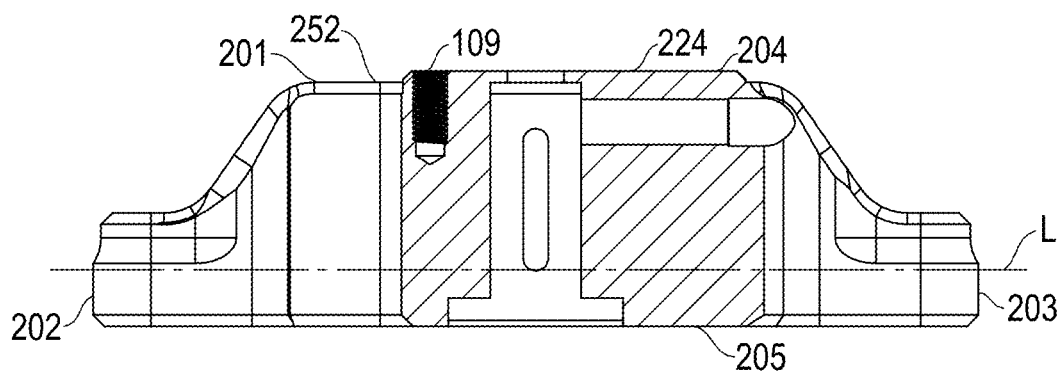
FIG. 12 is a cross-sectional view of the base taken along line 12 of FIG. 11.
Figures 15, 16:
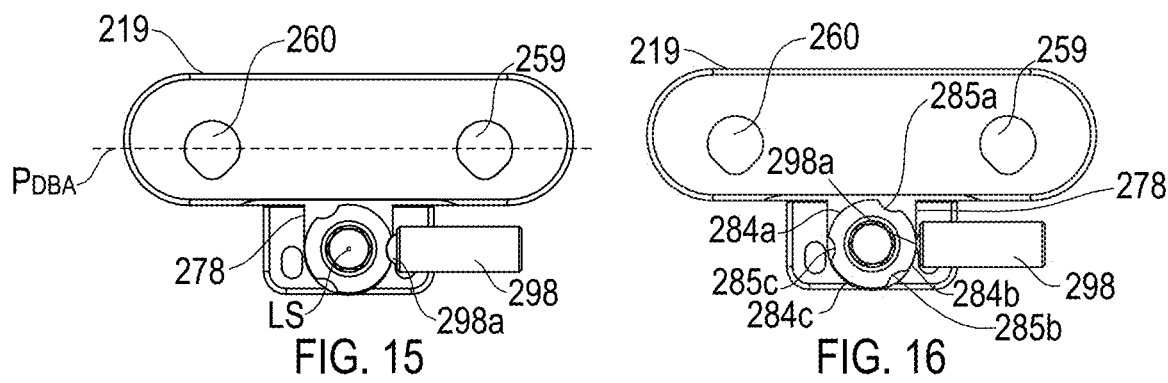
FIG. 15 is an internal view of the leadscrew of the transverse transport device at a first rotational orientation, according to an embodiment of the present disclosure.
FIG. 16 is an internal view of the leadscrew of the transverse transport device at a second rotational orientation, according to an embodiment of the present disclosure.

Internally, the base 201 and the movable stage 219 are coupled via a drive system 273 configured to enable translation of the movable stage 219 in relation to the base 201. The drive system 273 includes a leadscrew 274 rotatably contained within the base 201, and a nut 275 attached to the movable stage 219. The nut 275 has an external thread 276 and the movable stage 219 has an internally-threaded hole 277. The external thread 276 of the nut 275 is adhesively bonded to the internally-threaded hole 277 of the movable stage 219 such that the nut 275 and the movable stage 219 are statically coupled to each other. In other embodiments, the external thread 276 of the nut 275 is epoxy bonded or frictionally fit into the internally-threaded hole 277. The internally threaded hole 277 passes through a side projection 278 in the movable stage 219, such that the nut 275 and the leadscrew 274 have a leadscrew axis LS that is offset from a dynamic bone anchor plane PDBA (FIG. 15). In the embodiment of FIGS. 9-16, the dynamic bone anchor plane PDBA is substantially the same as a bone anchor plane PBA (FIG. 10). In other embodiments, the base 201 and the movable stage 219 can be configured such that the dynamic bone anchor plane PDBA is parallel to, but not the same as the bone anchor plane PBA. In other embodiments, the base 201 and the movable stage 219 can be configured such that the dynamic bone anchor plane PDBA at an angle to the bone anchor plane PBA. For example, the angle between can range from 1 degree to 60 degrees, or 5 degrees to 45 degrees, or 10 degrees to 30 degrees, wherein the two planes intersect at a line that is substantially parallel or colinear to base longitudinal axis L (FIG. 12).

Figure 13:
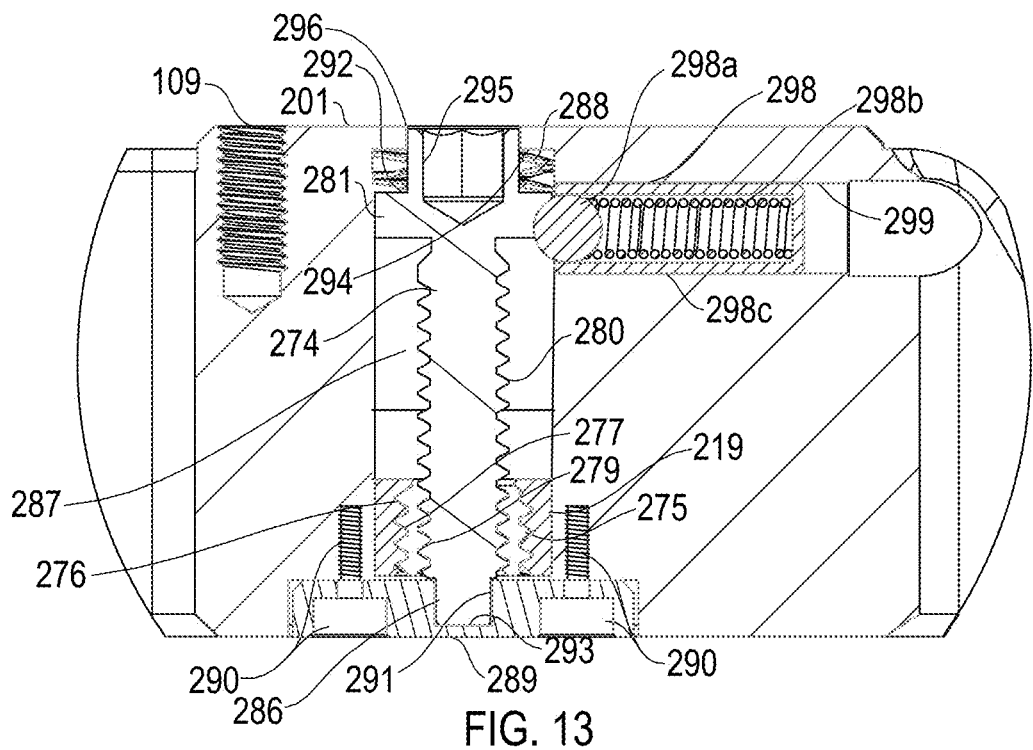
FIG. 13 is a detailed cross-sectional view similar to that of FIG. 12, but with the components of the transverse transport device included.
Figure 14:
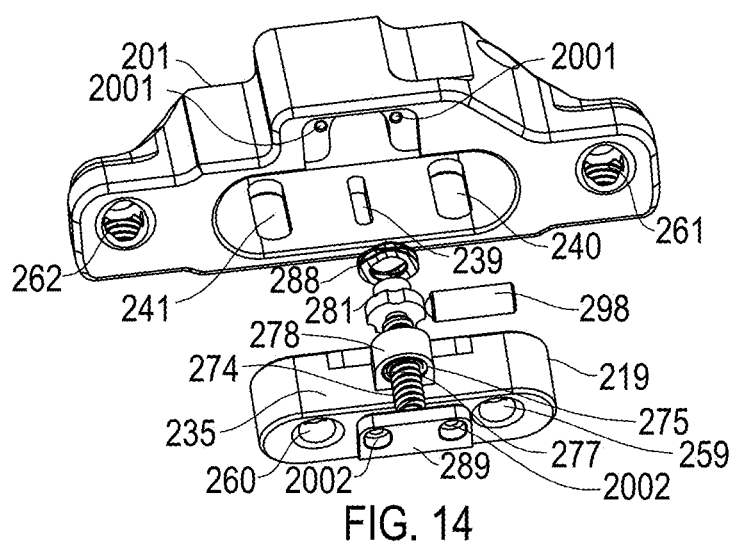
FIG. 14 is an exploded view of the transverse transport device of FIG. 7.

The nut 275 further comprises an internal thread 279 that is configured to threadingly engage an external thread 280 if the leadscrew 274. The leadscrew 274 further comprises a head 281 having a proximal flange 282 and a non-circular head section 283 between the flange 282 and the external thread 280. Turning to FIG. 16, the non-circular head section 283 comprises three convex arc portions 284a-c equally distributed around the leadscrew axis LS, and three concave depressions 285a-c, having arc shapes, equally distributed around the leadscrew axis LS, between each of the convex arc portions 284a-c. Instead of three of each, there can be one of each (e.g., wherein the arc of the single concave depression 285 is a lesser angle than the arc of the single convex arc portion, or vice versa). In some embodiments, there can be two of each or four or each or more. In some embodiments, the positions can even be asymmetrically distributed. The convex arc portions 284a-c and the concave depressions 285a-c together comprise an outer perimeter of the non-circular head section 383. The leadscrew 274 also comprises a distal cylindrical projection 286. The leadscrew 274 is captured within an internal leadscrew space 287 of the base 201 by placing three wave washers 288 over the proximal flange 282 and connecting a cap 289 to the base 201 with two screws 290 (FIG. 13). The two screws 290 pass through two holes 2002 in the cap 289, and then screw into two threaded holes 2001 in the base 201. The distal cylindrical projection 286 has a slightly smaller diameter than an internal cylindrical cavity 291 in the cap 289. The wave washers 288 apply a bias against an annular proximal face 292 of the non-circular head section 283 of the leadscrew 274 thus maintaining substantially longitudinal stability of the leadscrew 274 within the base 201, between an end face 293 of the internal cylindrical cavity 291 of the cap 289 and an annular face 294 of the base 201, against which the wave washers 288 apply their bi-directional bias. Although three wave washers 288 are utilized in the embodiment of FIG. 13, one or more wave washers can be used, or any other biasing member, such as a standard spring, or one or more a nylon or fluoropolymer washers or spacers. The head 281 of the leadscrew 274 includes an internal non-circular cavity 295 (screw drive) comprising a hex shape, though it can comprise any other non-circular shape. The cavity 295 is accessed (e.g, by a matching non-circular tip of the manual or motorized torquing tool) through an access hole 296 in the base 201. Markings 297 on the upper surface 204 of the base 201 indicate to a user the rotational directions for positive (+) and negative (−) relative translation of the movable stage 219 in relation to the base 201.

Using a torque tool, such as a screwdriver 218, a head 281 of the leadscrew 274 is engaged and rotated in a first rotational direction (arrow, FIG. 4) causing the movable stage 219 to move relative to the base 201 and in turn moving the dynamic bone anchors 214, 215 that are attached, for example, to the piece 216 that was cut from the tibia 1. By movement of this piece 216 of the tibia 1 in a direction that includes a transverse component in relation to the longitudinal axis 10 of the tibia 1, the growth-related stimulation can occur, including an increase of regenerative growth factors and systemic growth factors, stem cell serum levels, angiogenesis, and blood flow on the treated lower leg, and systemically.

A ball spring plunger 298 is statically held (e.g., frictional fit, adhesive, epoxy) within a horizontal cylindrical cavity 299 in the base 201, adjacent the non-circular head section 283 of the leadscrew 274, such that a ball 298a of the ball spring plunger 298 is configured to snap into and out of the concave depressions 285a-c as the leadscrew 274 is turned. The ball 298a has a bias into the concave depressions 285a-c that is applied by a spring 298b within a cylindrical shell 298c of the ball spring plunger 298. In FIG. 15, the leadscrew 274 is in a rotational orientation about the leadscrew axis LS such that one of the concave depressions 285 is engaged by the ball 298a of the ball spring plunger 298. In FIG. 16, the leadscrew 274 has been rotated to a rotational orientation about the leadscrew axis LS such that none of the concave depressions 285a-c is aligned with the ball 298a of the ball spring plunger 298. Thus, the ball 298a is forced by a convex arc portion 284 to compress the spring 298b into the shell 298c of the ball spring plunger 298. Each of the convex arc portions 284a-c, or other similar positive-space or neutral-space feature, comprises at least some radial projection or protrusion in relation to the concave depressions 285a-c, transverse to the leadscrew axis LS. Each of the concave depressions 285a-c, or other similar negative-space engagement feature, comprises at least some radial indentation in relation to the convex arc portions 284a-c, transverse to the leadscrew axis LS. A physical reaction occurs between a concave depression 285 and the ball 298a of the ball spring plunger 298 when the leadscrew 274 is moved from a non-engaged position (ball 298a compressed by convex arc portion 284) to an engaged position (ball 298a allowed to release into concave depression 285). This physical reaction (e.g., of a first metal piece accelerating into and striking another metal piece) produces a physical disturbance configured to be sensed by the user as an audible sound and/or as a tactile vibration. This disturbance provides information to the user, via the user's ears and/or fingers/ hands/arm or other body part or sense, and it relates to the user the extent of relative displacement between the translatable anchor and the base.

In a first embodiment, for example, each "click" sound that is heard by the user's ear, can represent one-third of a millimeter of movement of the movable stage 219 away from the tibia 1. In a second embodiment, each strong pulse of vibration that is felt by the user's hand can represent one-half millimeter of movement of the movable stage 219 toward the tibia 1. The audible sound can comprise a sound pressure level between 20 dB and 80 dB at a distance of 0.9 meter, or between 20 dB and 70 dB at a distance of 0.9 meter, or between 20 dB and 60 dB at a distance of 0.9 meter.

The front face 234 of the movable stage 219 includes a transverse hole 2003 into which a dowel pin 2004 is press fit.

The pin 2004 extends such that it travels up and down within the vertically-extending window 239 in the front face 242 of the base 201. The front face 242 of the base 201 includes indicators 2005 adjacent the vertically-extending window 239. Thus, the location of the pin 2004 in relation of the indicators 2005 allows a user to visualize the current amount of displacement of the movable stage 219 in relation to the base 201, and thus, in use, the amount of displacement of the piece 216 cut from the tibia 1, in relation to the tibia 1, itself. The bone piece 216 can be cut or otherwise removed from any bone, not necessarily the bone to which the anchors 208, 209 are coupled. These include, but are not limited to: a mandible, a clavicle, a humerus, a radius, an ulna, a femur, a fibula, an ilium, a phalange, a tibia, and a sacrum. Alternatively, instead of the bone piece 216, a non-bone growth stimulator can be utilized, including, but not limited to: a ceramic material, a glass material, a metal material, and a polymeric material. One or more growth stimulating composition can be used with or instead of the growth stimulator or the bone piece 216, including, but not limited to: a growth factor, a drug, and an antibiotic. Any of the bone anchors 208, 209 and the dynamic anchors 214, 215 can comprise K-wires, Steinmann pins, or bone screws. In some embodiments, the bone anchors 208, 209 comprise a K-wire having a diameter of between 0.9 mm and 2.0 mm, or between 0.9 mm and 1.6 mm, or between 1.2 mm and 2.0 mm, or between 1.2 mm and 1.5 mm, or about 1.6 mm, or about 2.0 mm.

Other features of the transverse tibia transport device (TTT device) 200 will be described in relation to the connectability of the TTT device 200 to a modular automated drive unit 102.

Figure 17:
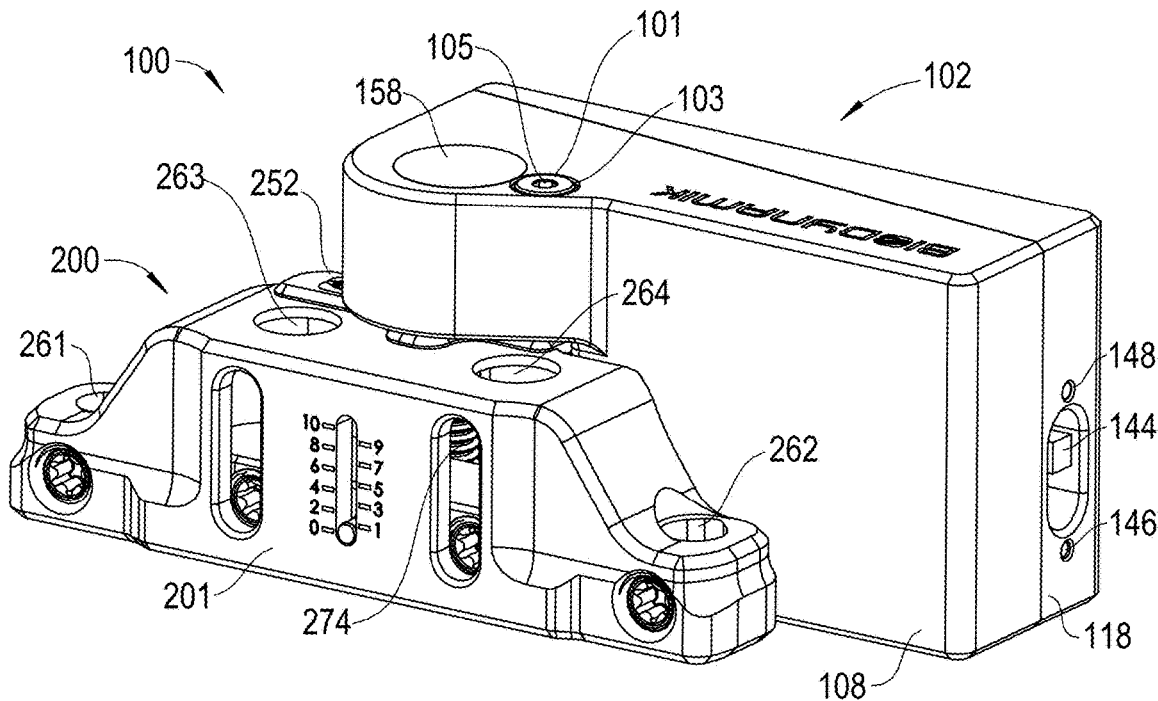
FIG. 17 is a first perspective view of a system for increasing biological activity within a patient, according to an embodiment of the present disclosure.
Figure 18:
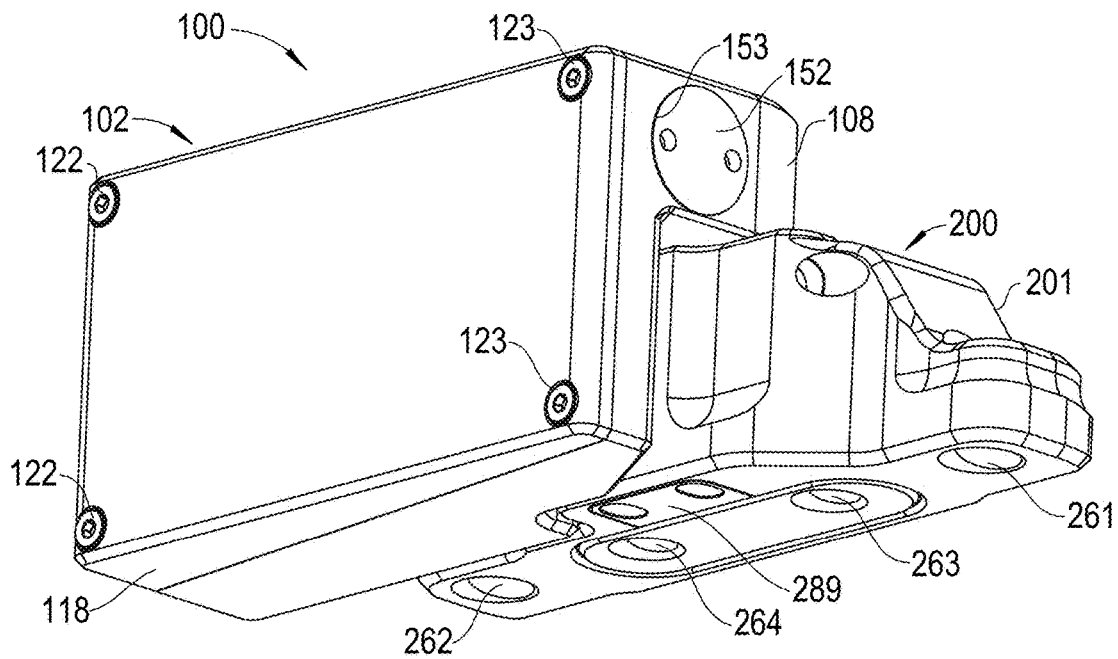
FIG. 18 is a second perspective view of the system of FIG. 17.
Figure 19:
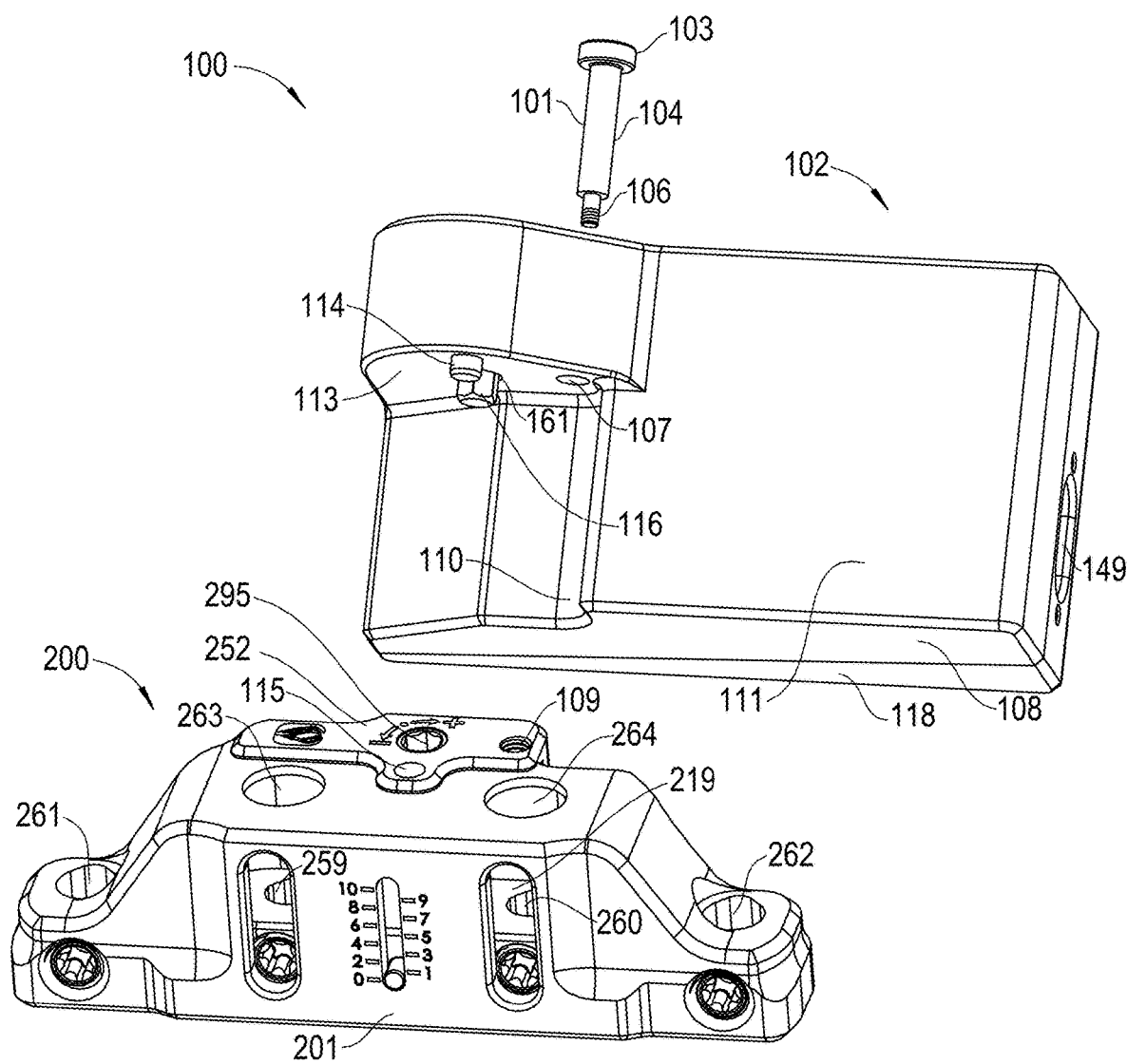
FIG. 19 is a perspective view of a coupling step of a transverse transport device and a modular automated drive unit, according to an embodiment of the present disclosure.
Figure 20:
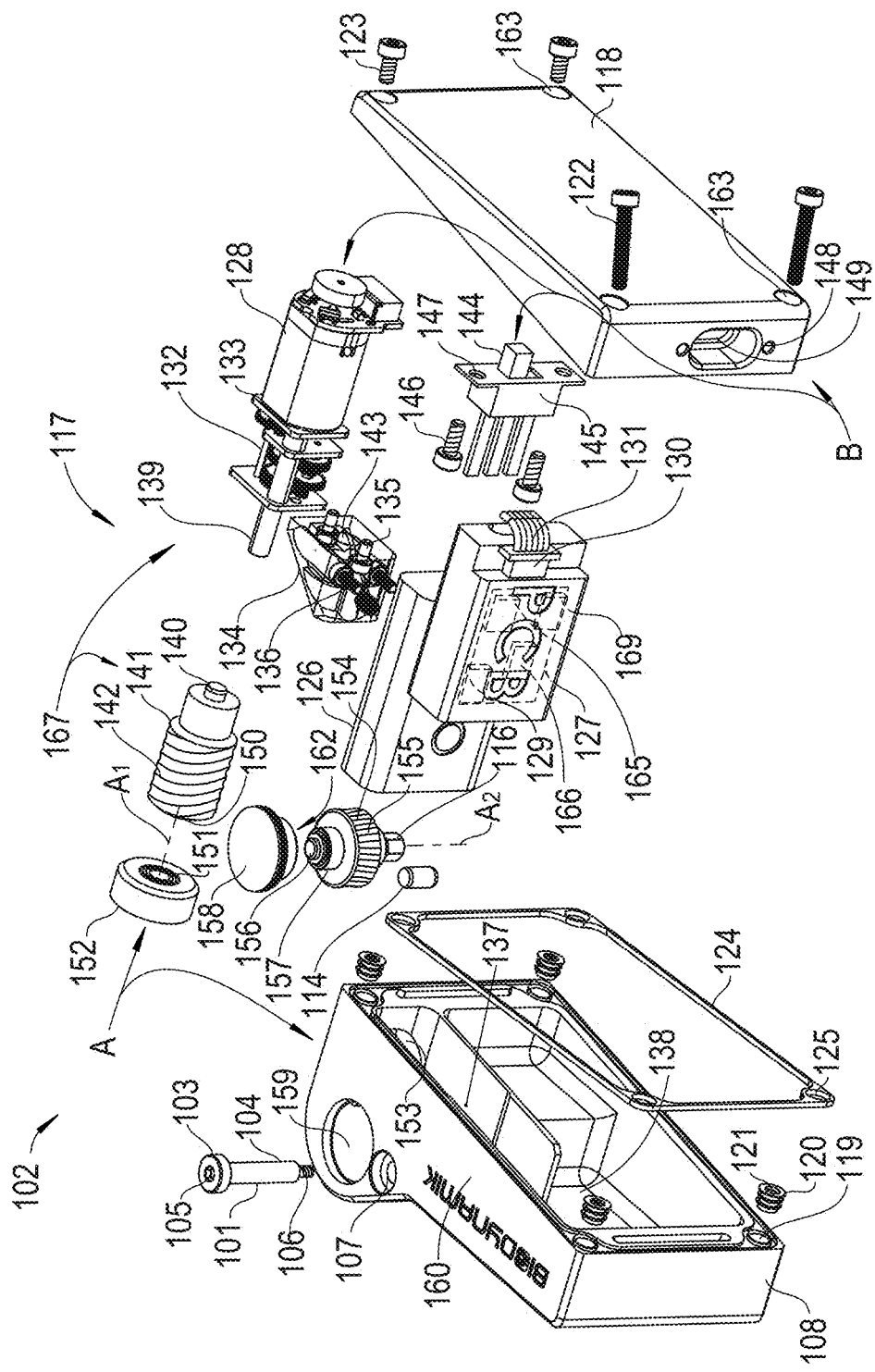
FIG. 20 is an exploded view of a drive unit of the system of FIG. 17, according to an embodiment of the present disclosure.

FIGS. 17-19 illustrate a system 100 for increasing biological activity within a patient comprising the transverse tibia transport device (TTT device) 200 and a modular automated drive unit 102. The modular drive unit 102 is configured to be coupled to the TTT device 200 for automatically driving the TTT device 200, and is configured to be decoupled from the TTT device 200. Turning to FIG. 19, a locking screw 101 comprises a head 103 having a screw drive 105, comprising a hexagonal cavity configured to be driven by a corresponding hex key or screwdriver tip. The locking screw 101 comprises a shaft 104 and a male threaded tip 106. The shaft 104 has a diameter that closely fits through a hole 107 in a first housing half 108 (FIG. 20). When the transverse tibia transport device (TTT device) 200 is engaged with the modular drive unit 102, as will be described, the male threaded tip 106 of the locking screw 101 is threadingly engaged and tightened into a corresponding female threaded hole 109 in the base 101 of the TTT device 200. The housing 108/118 comprises the first housing half 108 and a second housing half 118.

Figure 7:
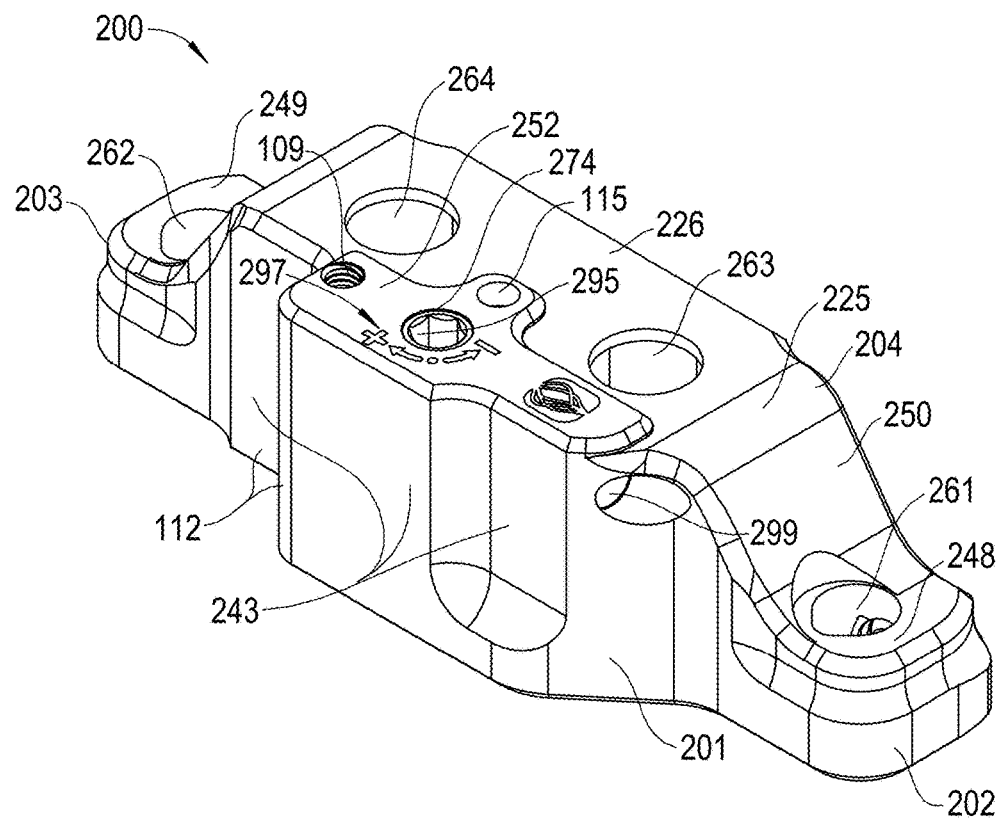
FIG. 7 is a perspective view of a transverse transport device, according to an embodiment of the present disclosure.
Figure 8:
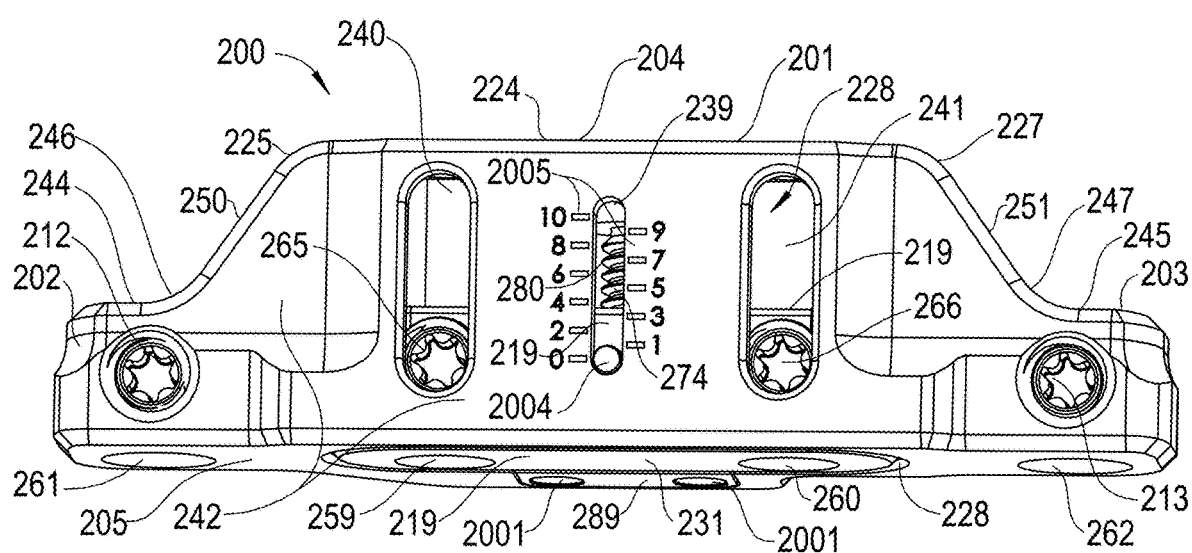
FIG. 8 is a perspective view of the transverse transport device of FIG. 7.

In use, a user can place the modular drive unit 102 onto a TTT device 200 prior to fully attaching the TTT device 200 to a patient. However, the following will be described in relation to a procedure in which the TTT device 200 is fully coupled to a patient 16, and subsequently the modular drive unit 102 is coupled to the TTT device 200 (see FIGS. 21-22). The TTT device 200 is engaged with the modular drive unit 102 by creating a substantially static fit between the TTT device 200 and the modular drive unit 102, and then locking the modular drive unit 102 to the TTT device 200 with the locking screw 101. A curved contour 110 on a front face 111 of the first housing half 108 of the drive unit 102 is configured to mechanically fit with a portion 112 of the back face 243 of the base 201 of the TTT device 200 (FIG. 7). Furthermore, a lower ledge face 113 of the first housing half 108 of the drive unit 102 is configured to rest on the raised access area 252 of the base 201 of the TTT device 200. A dowel pin 114 connected to the first housing half 108 and extending vertically downward therefrom is configured to insert into a hole 115 in the base 201 of the TTT device 200. The dowel pin 114 fits closely with the hole 115 and allows the modular drive unit 102 to index with the TTT device 200, although it does not need to be a friction fit. A driven output hex 116, which will be described in more detail, engages with and mates the non-circular cavity 295 of the leadscrew 274 of the TTT device 200. The driven output hex 116 turns within a clearance hole 161 of the first housing half 108. Thus, the curved contour 110, dowel pin 114 and driven output hex 116 of the modular drive unit 102 serve to fully index and stabilize the modular drive unit 102 with the TTT device 200, via their engagement with the portion 112, hole 115, and the non-circular cavity 295 of the TTT device 200. Because the dimensions of these features are maintained at standard levels of precision for molded plastic parts, it is relatively simple to place the nodular drive unit 102 onto a TTT device 200 that has been connected to a patient with sufficient engagement between the two. As mentioned, the locking screw 101 is then placed through the hole 107 in a first housing half 108 and the male threaded tip 106 is threadingly engaged with the female threaded hole 109 and the TTT device 200 and the modular drive unit 102 are locked together, by tightening of the locking screw 101 with a torque tool that has been inserted into the screw drive 105 of the locking screw 101. The curved contour 110 can be any type of chape that can hug or accept mating shape or fitting shape from the base 201 or any other portion of the TTT device 200. The engagement between the modular drive unit 102 and the TTT device 200 can be achieved with one or more element, including but not limited to: a pin, a hole, a depression comprising one or more linear boundaries, a depression comprising a curvilinear boundary, a protuberance comprising one or more linear boundaries, and a protuberance comprising one or more curvilinear boundaries. In some embodiments, one or more magnets can be used, such as permanent magnets or electromagnets, the magnets configured to be aligned with another magnet oriented such that opposite poles meet. In some embodiments one or more magnets can be used, and configured to be aligned with one or more ferrous metal piece, such as iron or steel.

Turning to FIG. 20, the modular drive unit 102 comprises components 117, including the first housing half 108 and a second housing half 118. The first housing half comprises four holes 119 into which externally-barbed, internally-threaded inserts 120 are press-fit, to provide internal threads 121. The two housing halves 108, 118 are secured together by long socket screws 122 and short socket screws 123, with a rectangular gasket 124 in between. The gasket 124 comprises four holes 125 that allow the screws 122, 123 to pass through. The screws 122, 123 are secured through holes 163 in the second housing half 118, holes 125 of the gasket 124, and into the internal threads 121. The gasket 124 allows the components 117 to be substantially sealed from the external environment. In FIG. 20, the components 117 are rotated approximately 90 degrees from the housing halves 108, 118 and gasket 124 in order to best illustrate all. End A and end B are labeled, for reference.

A battery 126 is configured to power circuitry 127 and an electric motor 128 The battery 126 can be a replaceable battery or a rechargeable battery. A rechargeable battery can be configured to be directly charged from a charging port, or wirelessly charged, via close inductive charging, or even by magnetic resonance wireless power transfer over distance. In some embodiments, the battery, itself, has a built-in charging circuit. In some embodiments, the battery 126 comprises a lithium or a lithium-ion polymer (LiPo) battery. The circuitry 127 comprises a printed circuit board PCB carrying a microcontroller 129. The microcontroller 129 can comprise a microprocessor. The microcontroller can have Bluetooth® (Bluetooth Special Interest Group) capability, and can comprise a built-in antenna. A connector 130 having conductors comprising cables or wires 131 is electrically coupled to the circuitry 127 and to the motor 128 (e.g., gearmotor) to provide power and control signals to the motor 128. The PCB can also couple to one or more port providing USB access and/or JTAG access. A switch 145 having a two or three position switch button 144 is coupled to an interior of the second housing half 118 by screws 146 that pass through clearance holes 147 in the switch 145, and secure to threaded holes 148 in the second housing half 118. The switch button 144 is accessible to a user through an access port 149 in the second housing half 118. In other embodiments, the switch 145 comprises a button that is pushed in to turn power on, but is twisted e.g., (spring-loaded, or along a threading) to turn off. For example, it can comprise an emergency power shut-off. The motor 128 is mechanically coupled to a gear box 132 at a connection site 133, which can comprise screw, other fasteners, or welding. The motor 128 and the gear box 132 are attached to the first housing half 108 by a motor mount 134. Two screws 135 attach the motor mount 134 to the gear box 132 and two screws 136 attach the motor mount 134 to two threaded holes 137 in an interior wall 138 of the first housing half 108. The gear box 132 includes an output shaft/connector 139 that secures to a projection 140 of a worm 141 having worm threading 142. The output shaft/connector 139 freely extends through a clearance hole 143 that passes through the motor mount 134. Thus, the output shaft/connector 139 is free to rotate.

The worm 141, at its distal end 150, couples to a ball bearing 151 that is held within an end cap 152 that inserts into a hole 153 in the first housing half 108, at side A. The ball bearing 151 allows the worm 141 to be stabilized and minimizes additional friction to the worm 141, as the worm 141 is rotated by the motor 128 and the gear box 132. The worm 141 transversely turns a worm wheel 154 having evenly cylindrically distributed teeth 155 configured to engage with the threading 142 of the worm 141. The driven output hex 116 is attached to the worm wheel via its shaft 156. The shaft 156 is held within a ball bearing 157 that is held within an internal circular pocket 162 in an end cap 158 that inserts into a hole 159 in a top side 160 of the first housing half 108. The combination of the gear box 132, the worm 141, and the worm wheel 154, and substantially everything between the motor 128 and the driven output hex 116 is referred to as the gear train 167.

Thus, rotation of the worm 141 in a first rotational direction about axis $A_1$ causes rotation of the worm wheel 154 in a first rotational direction about axis $A_2$. And, rotation of the worm 141 in a second, opposite rotational direction about axis $A_1$ causes rotation of the worm wheel 154 in a second, opposite rotational direction about axis $A_2$. Axis $A_1$ is oriented substantially 90 degrees from $A_2$. Thus, the length of the housing 108, 118 of the modular drive unit 102 between end A and end B can be parallel to the first end 202 and the second end 203 of the TTT device 200 as the lower ledge face 113 of the first housing half 108 of the drive unit 102 is placed in apposition to the raised access area 252 of the base 201 of the TTT device 200, and the elements 114, 116, 115, 295, 106, 109 are engaged and locked. And, the ball bearings 151, 157 maintain low friction rotation of the driven output hex 116, when it is coupled to the non-circular cavity 295 of the leadscrew 274 of the TTT device 200. In other embodiments, the worm 141 and worm wheel 154 can instead be replaced by an input bevel gear and an output bevel gear. Thus, a substantially 90-degree shaft angle (change in rotational axis) can also be accommodated, using the miter gear type of bevel gear combination. Other angles in between 90 degrees and zero degrees can also be accommodated with other bevel gear angles.

Figure 21:
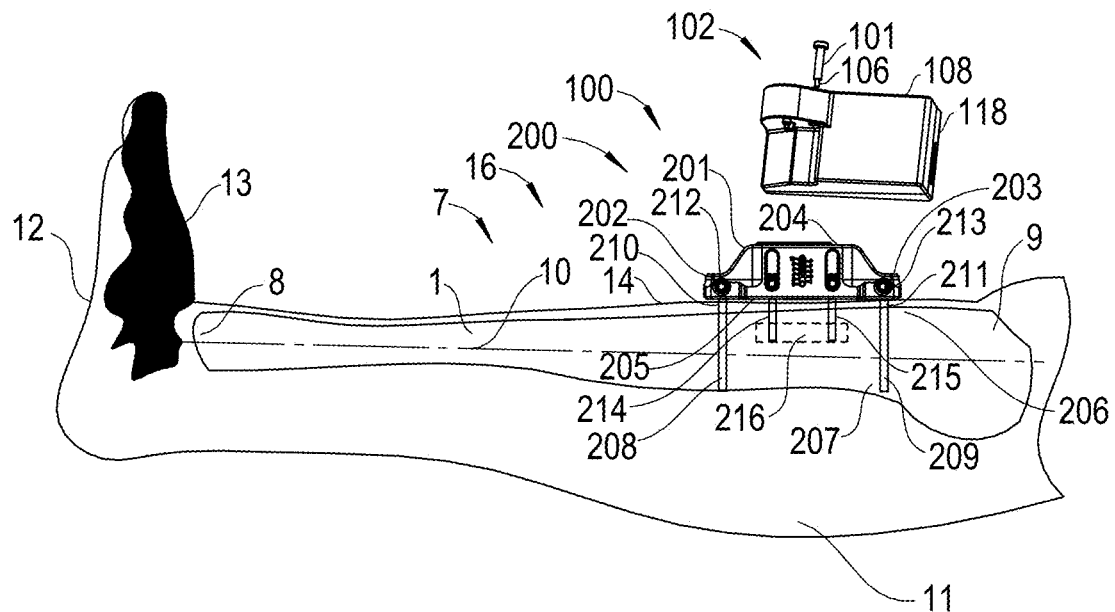
FIG. 21 illustrates the system of FIG. 17 in a first position in use, according to an embodiment of the present disclosure.
Figure 22:
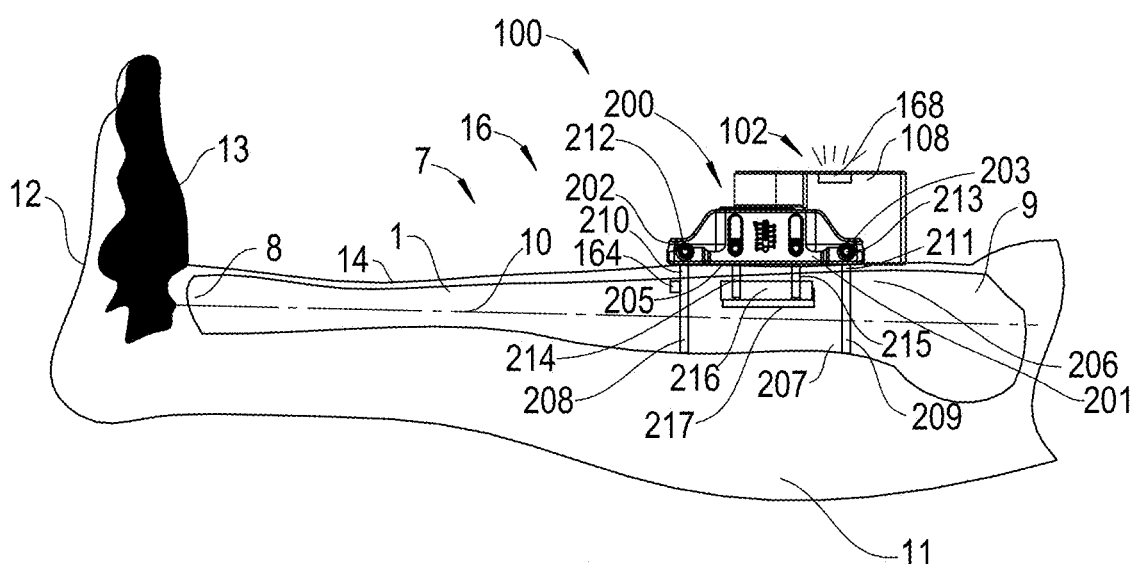
FIG. 22 illustrates the system of FIG. 17 in a second position in use, according to an embodiment of the present disclosure.

As in FIG. 4, FIG. 21 illustrates the TTT device 200 attached to the tibia 1 of a patient 16, as previously described. A user, or a patient 16 themself, decides to utilize a modular drive unit 102 to cause the movable stage 219 of the TTT device to move the bone piece 216 in relation to the tibia 1. The user places the modular drive unit 102 over and behind the TTT device 200 such that the curved contour 110 cradles the portion 112, the dowel pin 114 engages in the hole 115, and the driven output hex 116 keyingly fits inside the non-circular cavity 295. This indexes and stabilizes the modular drive unit 102 with the TTT device 200. The user then places the locking screw 101 through the hole 107 in a first housing half 108 and engages the male threaded tip 106 with the female threaded hole 109 and tightens the locking screw 101 with a torque tool that has been inserted into the screw drive 105. The modular drive unit 102 is now in place, coupled to the TTT device 200, as shown in FIG. 22. The user can now operate the modular drive unit 102 either from controls carried on the modular drive unit 102 not shown), or from a smart device/mobile device, or from an application on a cloud computing system. In some embodiments, the locking between the modular automation drive unit 102 and the TTT device 200 can be achieved via magnetic attraction. For example, a first magnet is embedded within the housing (e.g., in place of the hole 107), and a second magnet is embedded in place of the female threaded hole 109. The two magnets are oriented such that when brought together, their opposite poles face each other (e.g., North to South) and are thus configured to magnetically engage each other. The coupling between the modular automation drive unit 102 and the TTT device 200 can additionally or alternatively be achieved by magnetic coupling between the two devices wherein the male threaded tip 116 is embedded with one or multiple magnets with single or multiples poles, or is magnetized itself in this manner, while the non-circular cavity 295 can be surrounded by or embedded with one or more magnets with opposite polarities facing the magnet(s) in the (magnetized) male threaded tip 116. Again, North to South, whether one pair or multiple pairs of magnets.

The microcontroller 129 is configured to output a control signal that is delivered to the motor 128 via the connector 130 and wires 131. The control signal is configured to direct the motor to rotate the driven output hex 116 in a first rotational direction and/or a second, opposite rotational direction, at a constant rotational speed, or at more than one rotational speeds, at accelerating speeds or decelerating speeds, or at a pattern of different speeds and/or different changes in speed or velocity. In some embodiments, the microcontroller 129 is programmed and/or programmable to automatically cause rotation of the driven output hex 116 at a rotational velocity that that changes over time. In some embodiments, the microcontroller 129 is programmed and/ or programmable to automatically cause rotation of the driven output hex 116 at a rotational velocity that that changes over time according to a non-linear function. The non-linear function can comprise one or more of: an exponential function, a logarithmic function, a polynomial function, a quadratic function, a growth function, a delay function, a step function, and/or a decay function.

Figure 46:
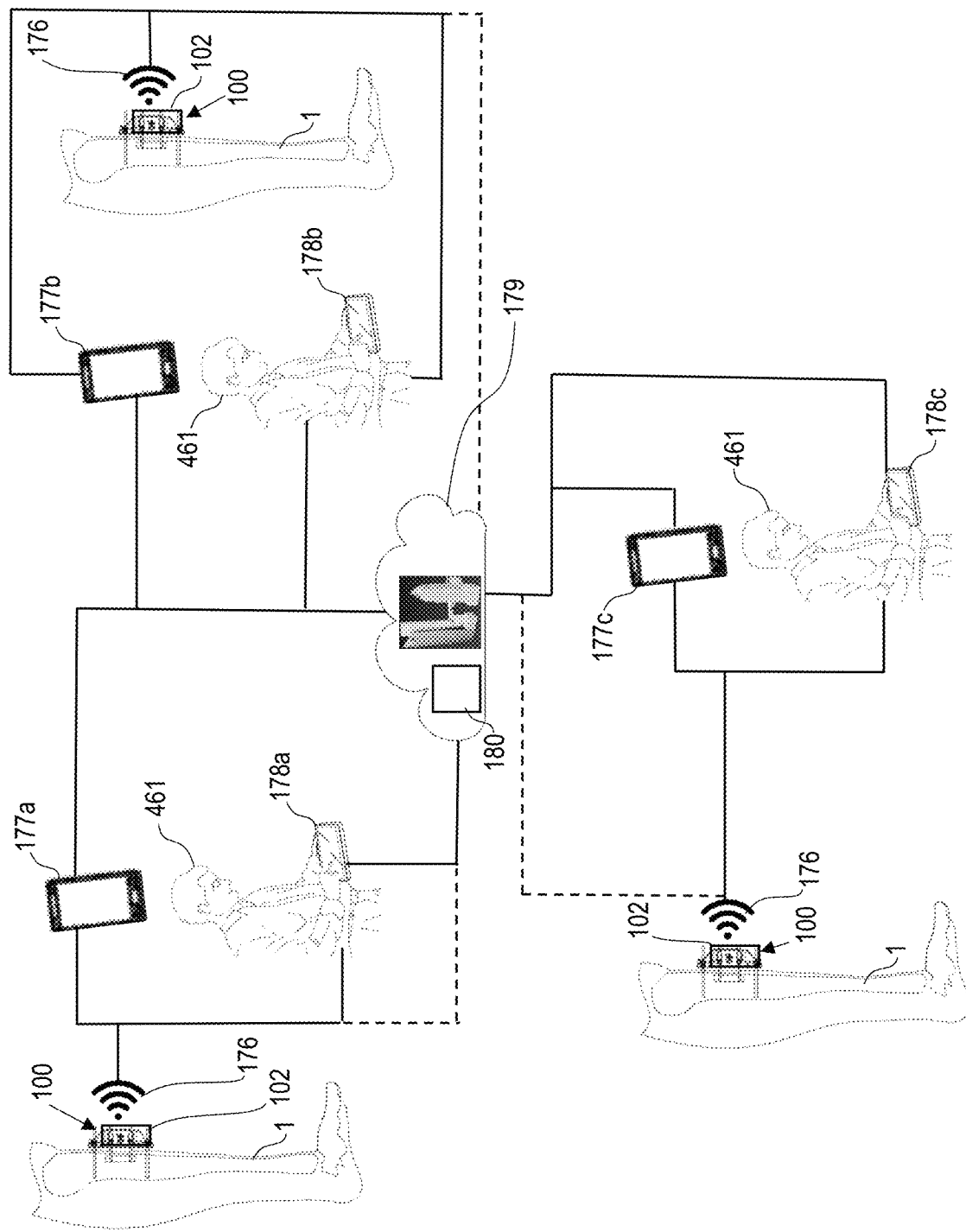
FIG. 46 is a schematic view of a communication hierarchy of a system for increasing biological activity within a patient, according to an embodiment of the present disclosure.

In some embodiments, the circuitry 127 is coupled to one or more sensor 164 (FIG. 22) configured to measure a parameter within the patient 16 and to output a signal indicative to the measured parameter. In some embodiments, the circuitry 127 can be directly coupled to the sensor 164 via a wired connection. In other embodiments, the circuitry 127 includes a receiver 165 (FIG. 20) configured to receive a wireless signal 176 (FIG. 46) output by the sensor 164 and indicative of the measured parameter. The wireless communication can include, but is not limited to: Bluetooth, BLE (Bluetooth low energy), NFC (near field communication), Wifi, or 4G/5G. In some embodiments, a smart device 177, 178 such as a smartphone 177a-c or a smart tablet 178a-c, or an app 180 on a cloud computing system 179 can be configured to receive a wireless signal 176 output by the sensor 164 and indicative of the measured parameter. The sensor 164 in some embodiments is a force transducer configured to measure force on tissue of the patient 16, including a force on a bone of the subject or a bone piece (for example, the tibia 1 and the bone piece 216). The sensor 164 in some embodiments is a temperature sensor (thermocouple, thermistor, RTD) configured to measure a temperature of tissue of the patient 16, including tissue adjacent a bone of the subject or a bone piece (for example, the tibia 1 and the bone piece 216). The tissue can comprise soft tissue, such as muscle, fat, tendon, ligament, nervous tissue, and other connective tissue. Certain changes in temperature, such as sudden increases in temperature, can indicate fever, injury, inflammation, infection, or irritation. The sensor 164 in some embodiments is an accelerometer configured to measure movement of the patient 16. The sensor 164 in some embodiments is an Inertial Measurement Unit (IMU) sensor configured to measure, track, and analyze body movement of the patient 16, such as acceleration, orientation, angular change rates, and gravitational forces. The IMU can comprise one or more accelerometers, one or more gyroscopes, and one or more magnetometers. In some cases, the movement can be movement of the patient 16 or of a limb or appendage of the patient 16. In some cases, the movement can be movement of the bone piece 216.

In other embodiments, the microcontroller 129 is instead a control unit that is carried by a cloud computing system 179 and is configured for wireless two-way communication, either with one or more modular drive units 102, directly or via a smart device App 180. The cloud computing system 179 is configured to be linked to a website or user interface platform where users can wirelessly view all of the data information and status related to the system 100. The data information and status are either stored in the cloud computing system 179, itself, or is stored within the modular drive unit 102, e.g., in a memory device, and which is then transmitted to the cloud computing system 179. The information can also be input into the system securely through the cloud 179 by a main user 461 or other personnel, or the patient and family members. The information can include one or more prescriptions, or other command information, such as patient action information or device command information. In other embodiments, the control unit comprises a portable smart device App 180 and is configured for wireless two-way communication with the modular drive unit 102. The portable smart device App 180 is configured for multiple platforms such as smart phones 177 or tablets 178 on different operating systems such as Android or iOS. The App 180 is configured to be securely two-way communicating with the system wirelessly, including receiving information from one or more sensors, and receiving system status information, as well as sending commanding and driving signals to the system, and instructions to the patient, either for their personal actions or in their actions operating the modular drive unit 102. The App 180 is also configured to display the system information either graphically or through audible sound, or through videos. The App 180 is also configured for users to input the prescription into the App 180 interactively. The App 180 is configured to be able to wirelessly two-way communicate with other multiple systems. The App 180 is also configured to be able to securely two way communicate with the cloud computing system 179. The display can be presented on an external device, the modular drive unit 102, itself, or on a website that can be viewed by a number of devices, including computing devices or monitors.

The modular drive unit 102 can be configured to directly two-way communicate with smart devices 177, 178, or to communicate directly with the central cloud 179. Multiple modular drive units 102 can directly two-way communicate with the central cloud 179. The App 180 can be loaded onto the smart phone/mobile phone 177 or tablet 178 or a personal computer (PC). Administrators, surgeons, hospital staff, sales representatives, or clinical specialists, or even patients and their friends and family (e.g., users 461) can view the progress of one or more systems 100 through the central cloud 179 as allowed per their specific viewing rights and permissions. The user 461 can change the prescription of one or more systems 100, through the central cloud 179, either directly or through the smart device 177, 178. The access to the App 180 and to the Cloud 179 can be password protected, and can include multiple authentication methods.

The microcontroller 129 can comprise a processor configured to receive the signal from the sensor 164 (or a plurality of sensors) directly or a processed or conditioned version of the signal from the sensor 164 and to compare the signal received with data and/or instructions stored on a non-transitory computer-readable medium which when executed by the processor configures the processing unit to execute a routine for operating the motor 128 and rotating the driven output hex 116. In some embodiments the medium comprises a memory 169 carried by the circuitry 127. In some embodiments, the microcontroller 129 comprises a processor that is configured to modify the instructions stored on a non-transitory computer-readable medium. In some embodiments, the microcontroller 129 comprises a processor that is configured to modify the instructions stored on a non-transitory computer-readable medium based at least in part on the signal from the sensor 164, for example the signal received by the receiver 165. Modifying the instructions can comprise changing from one preset routine for operating the motor to another preset routine for operating the motor 128. Modifying the instructions can comprise changing values in a preset routine to create a new routine. The values being changed can comprise, voltage applied, current generated, rise time, fall-off time, slew rate, hold duration, and time at completion. In some embodiments, the microcontroller 129 comprising a microprocessor can be configured to measure current that is run through motor, real-time, or with a delay, and to analyze the current. If sudden changes or changes above a threshold are measured, the microprocessor is configured to adjust the motor speed by applying a different voltage. This technique can mitigate excessive tissue tension or stress, to optimize clinical outcome.

In some embodiments, the circuitry 127 includes an artificial intelligence (AI) system 166 (FIG. 20) configured to be embedded with the processor or to integrate with the processor. The processor can comprise the microcontroller 129, or can comprise a separate microprocessor carried by the circuitry 127 or configured to communicate with the circuitry 127. In some embodiments, a smart device or an app on a cloud computing system can be configured to receive information output by AI system 166. In some embodiments, the microcontroller 129 is configured to respond to information output by the AI system 166 to change from one preset routine to another preset routine, or to modify values of a preset routine. In some embodiments, the AI system 166 is configured to provide an optimized prescription for the patient 16. The optimized prescription can comprise one or more portions of a routine, or a changed routine for operating the motor 128 and the driven output hex 116. For example, the AI system 166 can compare the initial data from the patient 16, in terms of any one or more values received from one or more sensors 164. The AI system, 166 can then compare these data with historical data from one or more database, and determine whether and how to modify parameters to optimize a prescription at that time for the patient 16. The optimized prescription can include instructions stored on a non-transitory computer-readable medium to automatically cause rotation of the driven output hex 116 at a rotational velocity that that changes over time according to a non-linear function. The non-linear function can comprise one or more of: an exponential function, a logarithmic function, a polynomial function, a quadratic function, a growth function, a delay function, a step function, and/or a decay function.

In another alternative embodiment, a physical energy generator 168 is carried on or in the modular drive unit 102 and is configured to generate a visible, audible, or tactile alert, or alarm, that is perceptible by the user. Thus, physical energy generator can be electrically coupled to the circuitry 127 and can be configured to be initiated by any signal received from a sensor 164, and/or from information received from the AI system 166, and/or from control instructions received from a memory 169 or from a smart device/mobile device, and/or from an application on a cloud computing system. The physical energy generator 168 can comprise a light, an LED, a flashing light, a flashing LED, a loudspeaker, a piezoelectric configured to vibrate, or a mechanical vibrator or mechanical noisemaker such as a clicking device or a buzzer. In another embodiment, the physical energy generator 168 is configured to generate a visible, audible, or tactile alert, perceptible by the user, that indicates when the modular drive unit 102 has been correctly coupled to the TTT device 200. For example, this can constitute all of alignment steps except the locking securement using the locking screw 101. Or, it can constitute all of the alignment steps and the locking securement using the locking screw 101. In some embodiments, the modular drive unit 102 and the TTT device 200 comprise Hall effect sensors or other proximity sensors that provide a signal to the circuitry 127 when the modular drive unit 102 and the TTT device 200 are separated by a distance less than a threshold distance. Thus, a processor reacts to a signal that is greater than a minimum or threshold signal emanating from the Hall effect sensor. In some embodiments, the threshold cannot be reached unless the alignment steps have all been performed, because otherwise the lower ledge face 113 would be able to sufficiently come close to the raised access area 252. In another embodiment, one or multiple Hall effect sensors are carried in or on the modular drive unit 102, and can detect the rotation of the leadscrew 274, or just a portion of the leadscrew 274, such as the head 281, or the non-circular cavity 295. For example, any portion of the leadscrew 274 comprises a magnet with single or multiple poles whose locations change as the leadscrew 274 is rotated. Thus, the magnetic fields of the one or more magnets move in concert with the rotation of the leasdscrew 274. The control unit can receive and process signals from the one or more Hall effect sensors, to confirm the rotation of the leadscrew 274, and thus confirm a stable coupling between the modular automation drive unit 102 and the TTT device 200 or PD device 300. In another embodiment, one or more proximity sensors are carried in or on the modular drive unit 102, and can detect the distance to or proximity of the movable stage 219, 319 inside the TTT device 200 or PD device 300, wherein movable stage 219, 319 comprises a magnet with single or multiple poles. Thus, the proximity sensor(s) can confirm the movement of the movable stage 219, 319, and thus confirm stable coupling between the modular automation drive unit 102 and the TTT device 200 or PD device 300.

Figure 23:
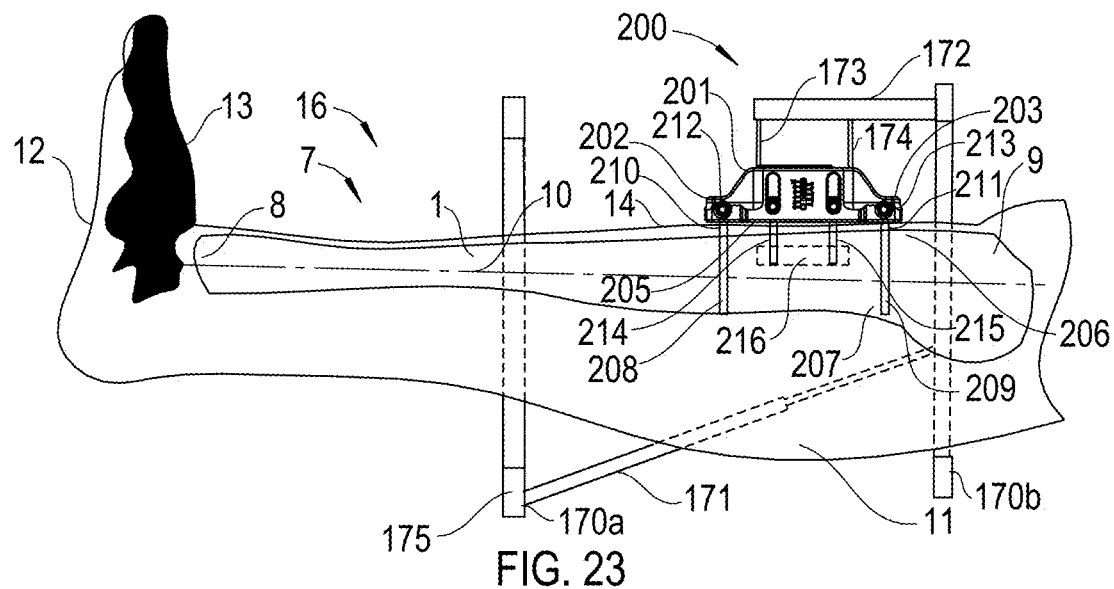
FIG. 23 illustrates a transverse transport device in use, coupled to an external fixator frame, according to an embodiment of the present disclosure.
Figure 24:
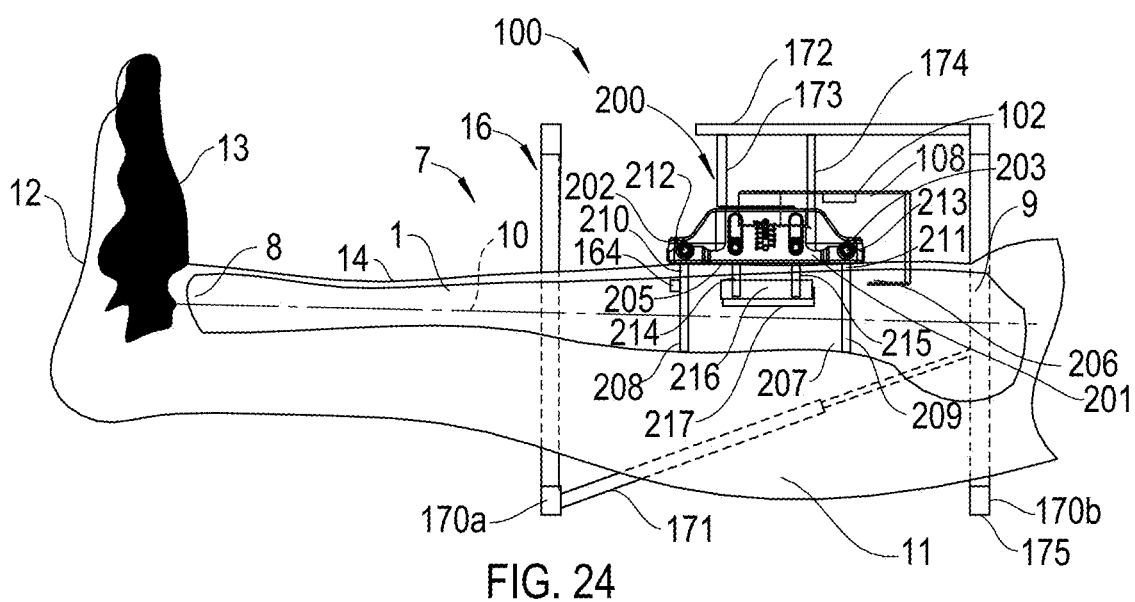
FIG. 24 illustrates a system for increasing biological activity within a patient in use, coupled to an external fixator frame, according to an embodiment of the present disclosure.

FIGS. 23 and 24 illustrate, respectively, a system 100 for increasing biological activity within a patient comprising the transverse tibia transport device (TTT device) 200 and a modular drive unit 102, coupled to an external fixator 175, and a transverse tibia transport device (TTT device) 200, coupled to an external fixator 175. Many patients 16 may have other orthopedic anomalies or morbidities, as well as being treated with transport device (TTT device) 200. In some patients, the orthopedic anomalies or morbidities may be been exacerbated by a diabetic condition of the patient. In some patients, the orthopedic anomalies or morbidities may have been at least partially caused or initiated by a diabetic condition of the patient. It may be desired to treat the orthopedic anomalies or morbidities while also performing therapy to increase biological activity with the transverse tibia transport device (TTT device) 200 alone or with the transverse tibia transport device (TTT device) 200 in combination with the modular drive unit 102.

The external fixator 175 comprises one or more rings 170, and it generically represented by a distal ring 170a and a proximal ring 170b. The rings 170 each extend at least partially around the lower leg 7 of the patient 16. One or more connecting rods 171 are coupled to the rings 170 and are sized and adjusted accordingly for the patient's needs. A longitudinal bar 172 is coupled to the proximal ring 170b, and extends distally. The longitudinal bar 172 is sufficiently stiff and has a sufficient diameter to remain rigid without significant bending. In other embodiments, the longitudinal bar 172 can be coupled to the distal ring 170a, and/or can extend proximally. Two fixation rods 173, 174 attach to the longitudinal bar 172 at first ends, and attach to the TTT device 200 at second ends. Thus, the TTT device 200 is further held in place and maintained in a stationary condition, by the attachment to the external fixator 175.

Returning to the periosteal distraction device (PD device) 300 of FIGS. 5-6, further details are illustrated in FIGS. 25-26, 31-32, and 41-42. The base 301 comprises a first end 302, and second end 303, an upper surface 304, and a lower surface 305. The upper surface 304 and the lower surface 305 each extend between the first end 302 and the second end 303. The base 301 includes a central portion 324 having a substantially planar top area 326 of the upper surface 304. The central portion 324 includes a hole 396 in which a head 381 of a leadscrew 320 is carried. The leadscrew 320 is rotatably locked underneath the lower surface 305 of the base 301 by a C-clip 388 (snap ring) (FIGS. 26 and 41), that is snapped around a circumferential groove 389 in the leadscrew 320, beneath the head 381. This substantially maintains the longitudinal position of the leadscrew 320 relative to the base 301, which still allowing the leadscrew 320 to rotate about a leadscrew axis LS.

A movable stage 319, comprising a plate, is configured to engage an internal, underneath portion of periosteum 5 of the bone (e.g., tibia 1). The movable stage 319 comprises an upper surface 330, a lower surface 331, a first end 332, a second end 333, a front edge 334, and a back edge 335. The first end 332 comprises a semi-circular curve 336, and the second end 333 comprises a partial semi-circular curve 337, having a smaller semi-circular notch 328. The movable stage 319 includes a series of transverse holes 339. The movable stage 319 further comprises an internal thread 379 configured to threadingly engage an external thread 380 of the leadscrew 320. The leadscrew 320 further comprises a shaft 340 extending distally from the head 381. The leadscrew 320 also comprises a distal cylindrical projection 386. The movable stage 319 additionally has an internal thread 427 passing therethrough and adjacent the semi-circular notch 328, which will be described in detail later.

Bone anchors 308, 309, are statically coupled to the base 301 by compressing clamping portions 310, 311 of the base 301 with set screws 312, 313, respectively. The movable stage 319 includes two holes 368, 369 that are larger than the diameter of the bone anchors 308, 309 and are configured to pass over the bone anchors 308, 309, respectively, to allow the movable stage 319 to translate over the bone anchors 308, 309, being guided, but not impeded by them. The first clamping portion 310 of the base 301 comprises a first counterbore hole 353 configured to rotatably capture a head 359 of the first set screw 312. An internal thread 360 (FIG. 41) in a rear section 363 threadingly engages a male thread 355 of the first set screw 312. The second clamping portion 311 of the base 301 comprises a second counterbore hole 354 configured to rotatably capture a head 364 of the second set screw 313. An internal thread 366 (FIG. 41) in a rear section 367 threadingly engages a male thread 356 of the second set screw 313. The set screws 312, 313 each comprise a screw drive 357, 358 for keyingly engaging a drive tip of a torque tool, such as a screwdriver or a motorized driver. The screw drives 357, 358 can comprise any non-circular cavity shape, but can alternatively comprise a non-circular protrusion/protuberance. The non-circular shape of the screw drives 357, 358 can comprise any one of a hex, a torx, a slot, a Phillips or other X-shape or cruciform shape, a Robertson or other square shape, a security or tamper-resistant shape, an oval, a spanner, a pentalobular, a tri-point, a multiple square, or any combination thereof.

A first end portion 344 includes a vertically-extending hole 361 passing therethrough, and a second end portion 345 includes a vertically-extending hole 362 passing therethrough. The holes 361, 362 are sized to allow the bone anchors 308, 309 to be passed therethrough. By tightening the set screws 312, 313, the heads 359, 364 are pulled toward the rear sections 363, 367, thus flexing the beam portions 314, 315 inwardly. This flexure causes the effective inner diameter of the holes 361, 362 to decrease, such that the inner surfaces around the holes 361, 362 grips the bone anchors 308, 309 firmly on their shafts.

Prior to engaging the thread 355 of the set screw 312 during assembly of the PD device 300, a ball spring plunger 398 having a spring-loaded ball 398a (similar to ball spring plunger 298) is slid into transverse hole 399 (FIG. 26) which continues to the center of the base 301, communicating with the hole 396. The ball spring plunger 398 can be press-fit into the hole 396 such that the ball 398a has a similar relationship with the head 381 of the leadscrew 320, as does the ball 298a with the head 281 of the leadscrew 274. The three convex arc portions 384 are equally distributed around the leadscrew axis LS, and three concave depressions 385 are evenly distributed between the convex arc portions 384.

Figure 31:
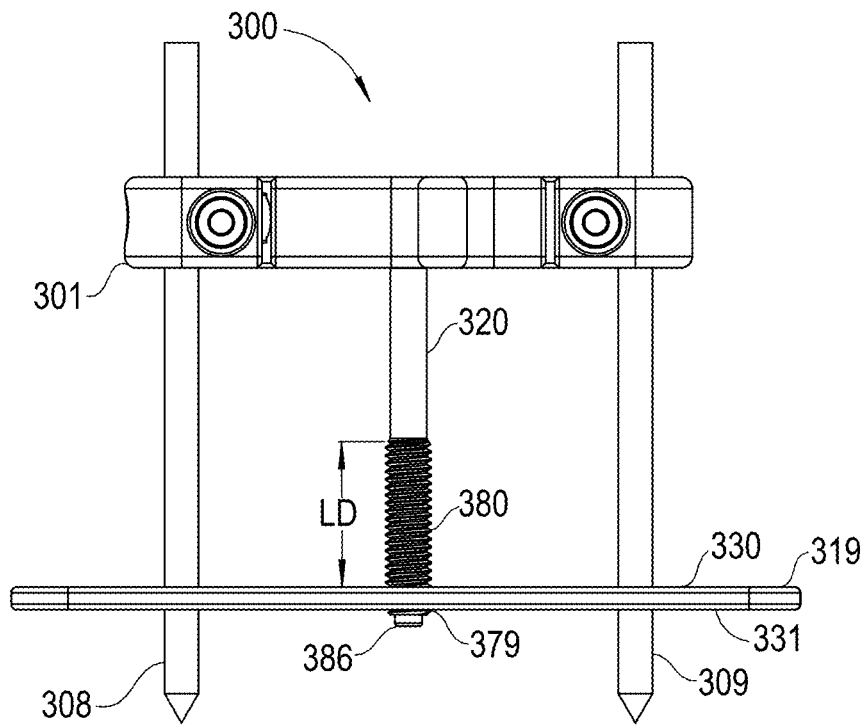
FIG. 31 is a front view of the periosteal distraction device of FIG. 25 showing a first distraction amount, according to an embodiment of the present disclosure.
Figure 32:
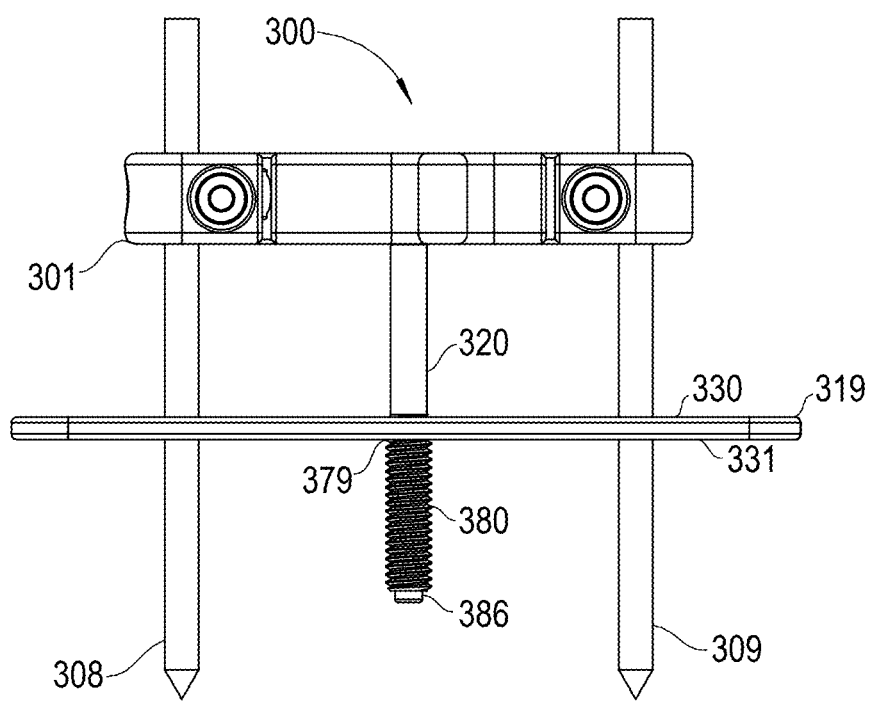
FIG. 32 is a front view of the periosteal distraction device of FIG. 25 showing a second distraction amount, according to an embodiment of the present disclosure.

A physical reaction occurs between a concave depression 385 and the ball 398a of the ball spring plunger 398 when the leadscrew 320 is moved from a non-engaged position (ball 398a compressed by convex arc portion 384) to an engaged position (ball 398a allowed to release into concave depression 385). This physical reaction (e.g., of a first metal piece accelerating into and striking another metal piece) produces a physical disturbance configured to be sensed by the user as an audible sound and/or as a tactile vibration. This disturbance provides information to the user, via the user's ears and/or fingers/hands/arm or other body part or sense, and it relates to the user the extent of relative displacement between the translatable anchor and the base. The physical disturbance can be configured, as previously described in relation to the ball spring plunger 298 and the leadscrew 274. Thus, the amount of movement of the movable stage 319, and thus the amount of stretching of the periosteum 5 can be quantified in real-time by the user. FIG. 31 illustrates the PD device 300 in a first distraction position, with the movable stage 319 at the bottommost extent in relation to the external thread 380 of the leadscrew 320. In procedures in which the periosteum 5 is to be distracted away from its related bone, the position of FIG. 31 would often be the starting position. However, in some cases, if the expected amount of total distraction expected in the patient is less than the total displacement length LD, it may be desired to begin with the movable stage 319 in a higher, pre-displaced position than that shown in FIG. 31. FIG. 32 illustrates the PD device 300 in a second distraction position, with the movable stage 319 at the topmost extent in relation to the external thread 380 of the leadscrew 320. The external thread 380 can in some embodiments include lead in portions at each end, to avoid any possible locking up between the external thread 380 and the internal thread 379. The external thread 380 can in some embodiments be fabricated to extend beyond the possible translation of the movable stage 319 at each end, each direction of travel, to avoid bottoming out.

Like the TTT device 200, the PD device 300 can be operated manually, by use of a torque tool, or can be coupled with the modular drive unit 102 for automatic operation. All of the capabilities of the system 100 are possible with a system coupling the PD device 300 with the modular drive unit 102, including wired or wireless communication, control via a microcontroller in the drive unit 102, or by a smart device, or from a cloud computing system. All of the types of control, and control algorithms, are also possible, as well as the incorporation of artificial intelligence (AI).

Figure 29:
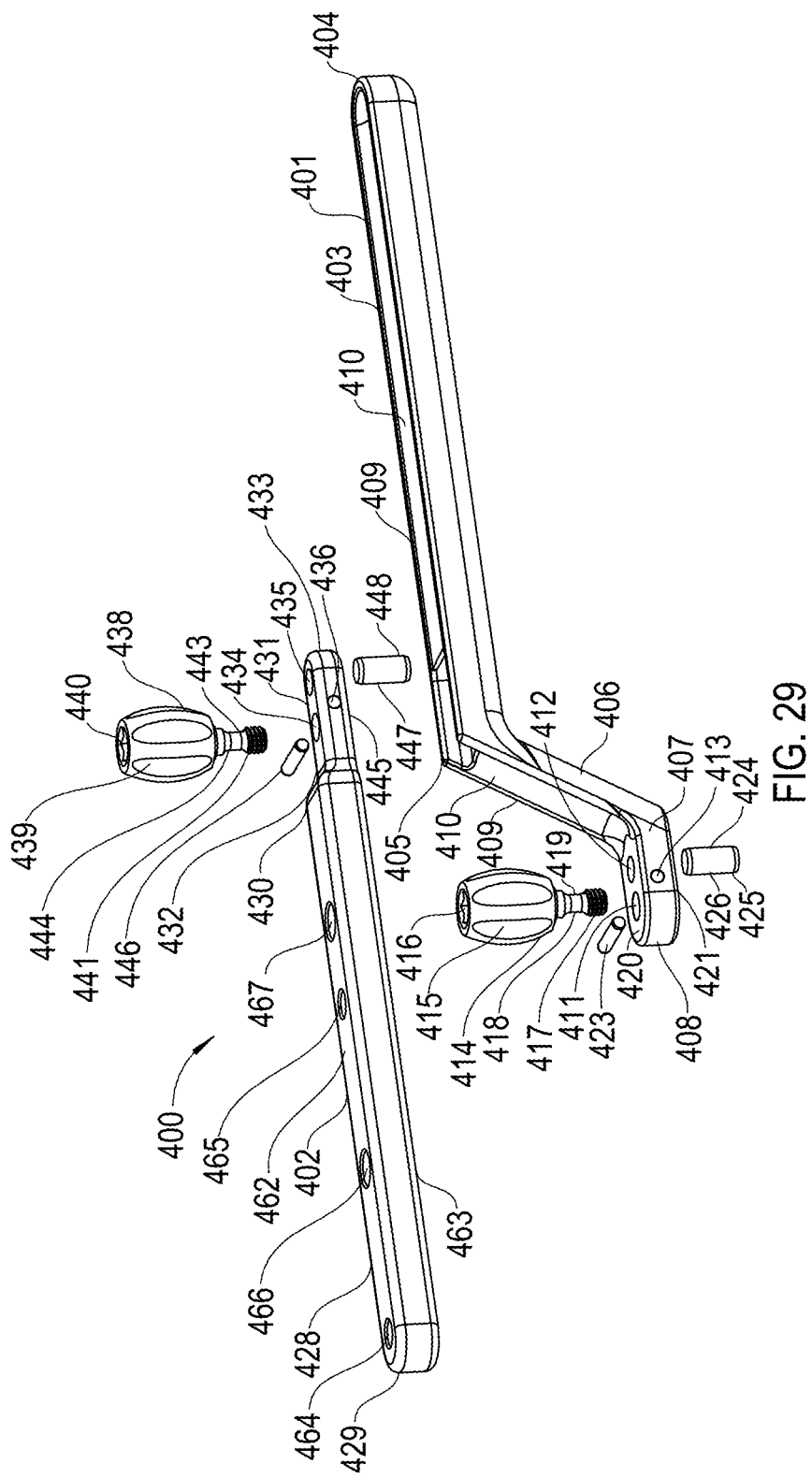
FIG. 29 is an exploded view of the insertion tool, according to an embodiment of the present disclosure.
Figure 35:
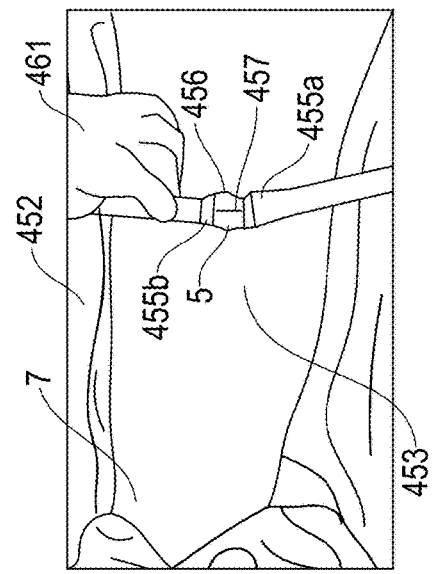
FIG. 35 is a plan view of a third step for preparing a patient for implantation of a periosteal distraction device, according to an embodiment of the present disclosure.

Turning to FIGS. 27-30, an insertion tool 400 is configured for inserting the movable stage of the PD device 300 and the bone anchors 308, 309 within a patient and enabling correct attachment of the PD device 300 to the patient. The movable stage 319 is to be inserted through an incision 454 in the skin (FIG. 36) and an incision 457 in the periosteum 5 (FIG. 35). The base 301 of the PD device 300 is to be carried on or above the skin 14 of the patient 16. Thus, the insertion tool 400 also serves as an alignment tool, to couple the bone anchors 308, 309 with the movable stage 319. FIG. 29 illustrates the components of the insertion tool 400. The insertion tool 400 comprises two main elongate bodies/arms, a stage-holding arm 401 and an attachable/detachable targeting arm 402. Each of these arms 401, 402 comprises a low-density, biocompatible metal, such as anodized aluminum, or alternatively a high-strength engineering plastic or polymer composite.

The stage-holding arm 401 comprises an elongate proximal handle 403 having a proximal end 404 and a distal end 405, an angled transition portion 406, and a distal connection portion 407. The angled transition portion 406 extends between the distal connection portion 407 and the distal end 405 of the handle 403. The proximal end 404 of the handle 403 and the distal end 408 of the distal connection portion 407 represent the proximal end and the distal end of the stage-holding arm 401, respectively. The handle 403 and the transition portion 406 comprise rail portions 409 on the lateral edges for maintaining relatively high bending stiffness, and a hollowed-out central portion 410 for reduced overall weight of the arm 401. The distal connection portion 407 includes a vertically-extending tightening nut clearance hole 411, a vertically-extending dowel pin hole 412 that is substantially parallel to the clearance hole 411, and a horizontally-extending dowel pin hole 413. The longitudinal distance between centers of the nut clearance hole 411 and the horizontally-extending dowel pin hole 413 is configured such that there is communication 422 (FIG. 30) between them. In other words, this distance is less than the sum of the radius of the nut clearance hole 411 plus the radius of the horizontally-extending dowel pin hole 413. The communication 422 comprises a longitudinally-extending opening between the nut clearance hole 411 and the horizontally-extending dowel pin hole 413. A tightening screw 414 includes a proximal knurled handle 415 having a proximal screw drive 416, a distal male threaded portion 417, and a central shaft 418 extending between the handle 415 and the male threaded portion 417. The shaft 418 comprises an hourglass contour 419 comprising a circumferential concavity having a radius. The male threaded portion 417 is inserted through the clearance hole 411 from a top face 420 of the distal connection portion 407 such that it extends out from a bottom face 421 of the distal connection portion 407. In this position, the hourglass contour 419 of the shaft 418 resides within the clearance hole 411, immediately adjacent to the communication 422 between the clearance hole 411 and the dowel pin hole 413. A dowel pin 423 is press fit into the dowel pin hole 413, which locks the tightening screw 414 in place via the hourglass contour 419, while still allowing free rotation of the tightening screw 414.

Figure 25:
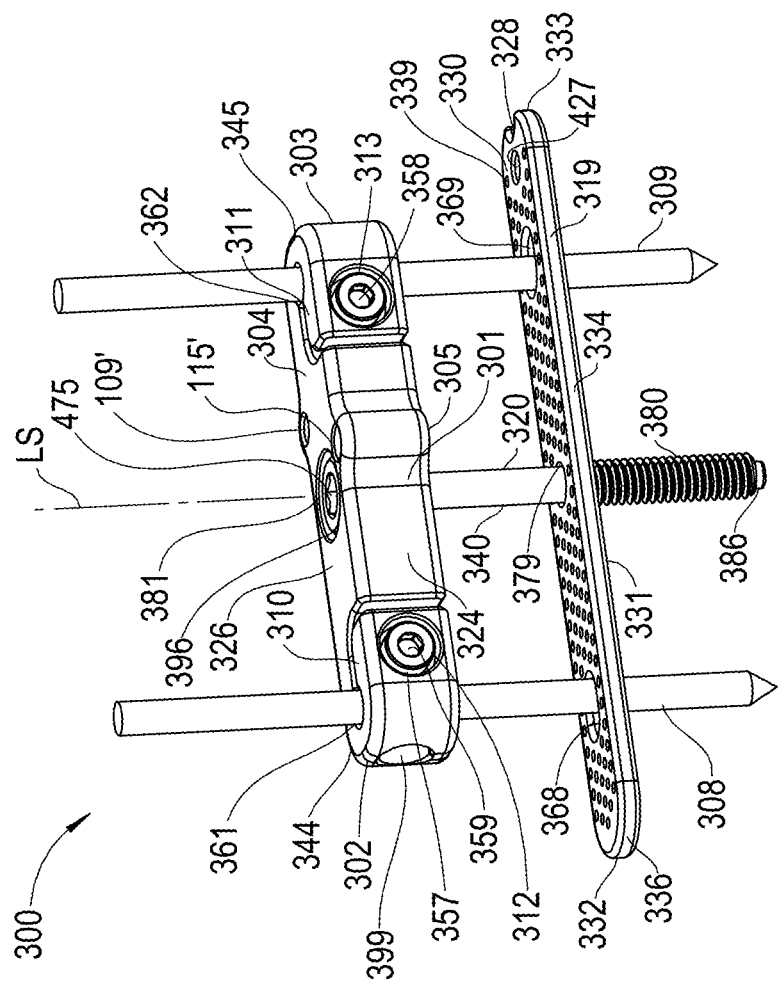
FIG. 25 is a perspective view of a periosteal distraction device, according to an embodiment of the present disclosure.
Figure 26:
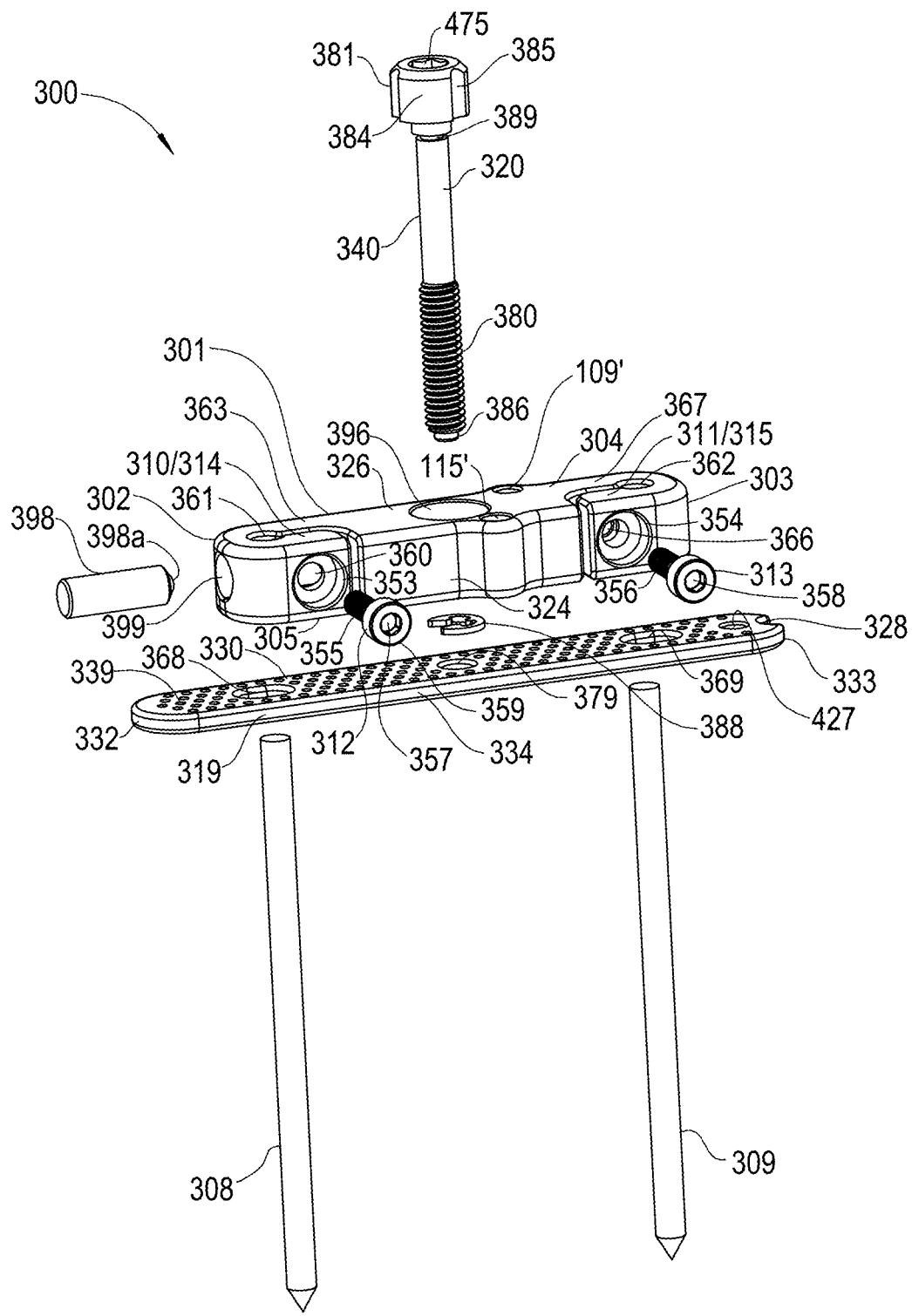
FIG. 26 is an exploded view of the periosteal distraction device of FIG. 25.

An indexing dowel pin 424 is press fit into the vertically-extending dowel pin hole 412. Thus, a lower portion 425 of the dowel pin 424 extends below the bottom face 421 of the distal connection portion 407 for indexing with the movable stage 319, and the distal male threaded portion 417 of the tightening screw 414 is rotatable below the bottom face 421 of the distal connection portion 407 via manipulation of the knurled handle 415 or the screw drive 416 (e.g., via a manual or motorized torque tool). The semi-circular notch 328 in the movable stage 319 is shown in FIGS. 25, 26, and 28. In use, a user indexes the stage-holding arm 401 with the movable stage 319 by placing a distal portion of the outer diameter 426 flush against the semi-circular notch 328. This stabilizes the longitudinal relationship between the stage-holding arm 401 and the movable stage 319 as well as the lateral relationship of the second end 333 of the movable stage with respect to the stage-holding arm 401. The user then places the distal male threaded portion 417 of the tightening screw 414 adjacent the matching internal thread 427 in the movable stage 319, and tightens the threaded portion 417 into the internal thread 427 to lock the stage-holding arm 401 to the movable stage 319 in their intended relative positions.

The targeting arm 402 is then coupled to the stage-holding arm 401. The targeting arm 402 is configured to deliver the bone anchors 308, 309 through the skin 14 of the patient 16 and through the holes 368, 369 of the movable stage 319. The targeting arm 402 comprises an elongate targeting portion 428 having a distal end 429 and a proximal end 430, and a handle-connection portion 431 having a distal end 432 and a proximal end 433. The proximal end 433 of the handle-connection portion 431 and the distal end 429 of the targeting portion 428 define the proximal end and the distal end, respectively, of the targeting arm 402. The handle connection portion 431 includes a vertically-extending tightening nut clearance hole 434, a vertically-extending dowel pin hole 435 that is substantially parallel to the clearance hole 434, and a horizontally-extending dowel pin hole 436. The longitudinal distance between centers of the nut clearance hole 434 and the horizontally-extending dowel pin hole 436 is configured such that there is communication 437 (FIG. 27) between them. In other words, this distance is less than the sum of the radius of the nut clearance hole 434 plus the radius of the horizontally-extending dowel pin hole 436. The communication 437 comprises a longitudinally-extending opening between the nut clearance hole 434 and the horizontally-extending dowel pin hole 436. A tightening screw 438 includes a proximal knurled handle 439 having a proximal screw drive 440, a distal male threaded portion 441, and a central shaft 442 extending between the handle 439 and the male threaded portion 441. The shaft 442 comprises an hourglass contour 443 comprising a circumferential concavity having a radius. The male threaded portion 441 is inserted through the clearance hole 434 from a top face 444 of the handle-connection portion 431 such that it extends out from a bottom face 445 of the handle-connection portion 431. In this position, the hourglass contour 443 of the shaft 442 resides within the clearance hole 434, immediately adjacent to the communication 437 between the clearance hole 434 and the dowel pin hole 436. A dowel pin 446 is press fit into the dowel pin hole 436, which locks the tightening screw 438 in place via the hourglass contour 443, while still allowing free rotation of the tightening screw 438.

Figure 30:
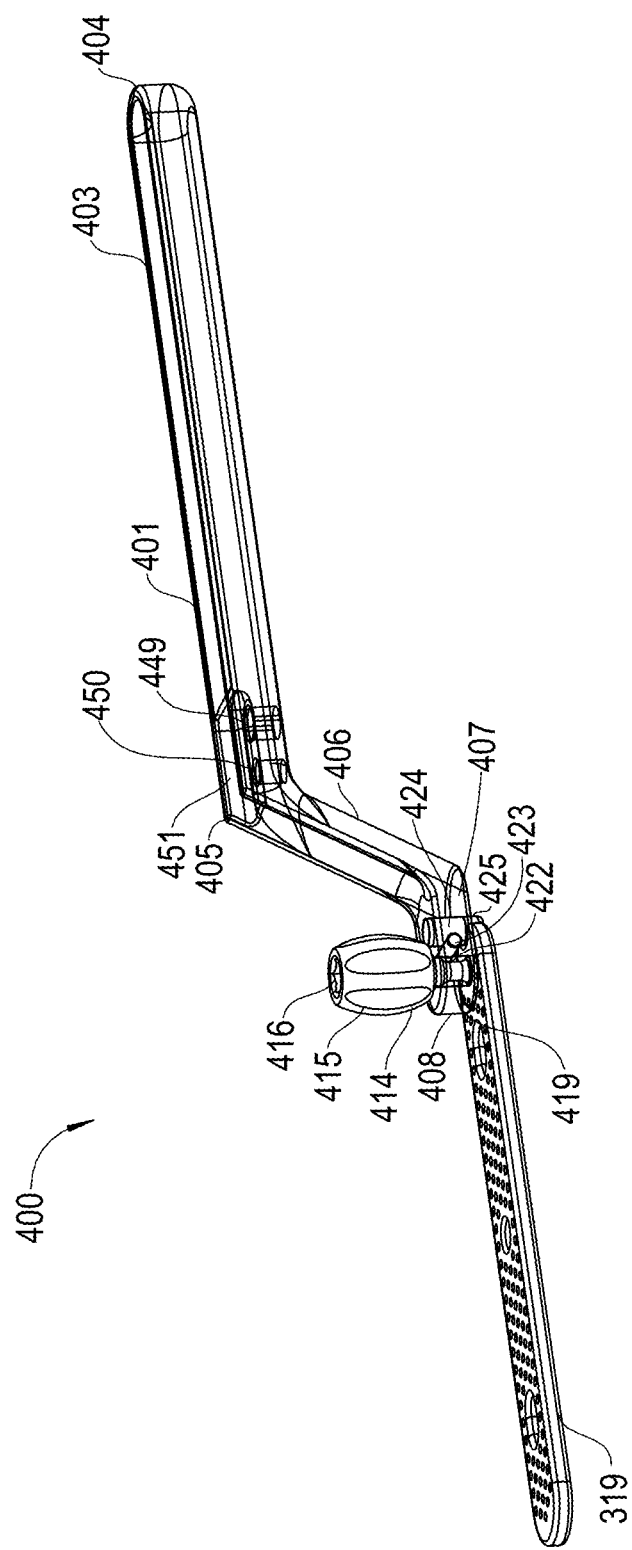
FIG. 30 is a perspective view of a movable stage loaded onto a first portion of the insertion tool, according to an embodiment of the present disclosure.

An indexing dowel pin 447 is press-fit into the vertically-extending dowel pin hole 435. Thus, a lower portion 448 of the dowel pin 447 extends below the bottom face 445 of the handle-connection portion 431 for indexing with the stage-holding arm 401, and the distal male threaded portion 441 of the tightening screw 438 is rotatable below the bottom face 445 of the handle-connection portion 431 via manipulation of the knurled handle 439 or the screw drive 440 (e.g., via a manual or motorized torque tool). FIG. 30 shows the stage-holding arm 401 coupled to the movable stage 319 without the targeting arm 402 attached. This allows better visibility of the features of the stage-holding arm 401. Although the insertion and attachment steps shown in FIGS. 37-39 utilize both the stage-holding arm 401 and the targeting arm 402 attached together, in alternative insertion methods, the movable stage 319 can be inserted with the use of the stage-holding arm 401, without the targeting arm 402. The handle 403 of the stage-holding arm 401, adjacent its distal end 405 comprises a vertically-extending indexing hole 449 and a vertically-extending female threaded hole 450. Both of these holes 449, 450 are within a recessed portion 451. The recessed portion 451 is configured to fit the handle-connecting portion 431 of the targeting arm 402. In use, a user orients and indexes the targeting arm 402 with the stage-holding arm 401 by placing the handle-connecting portion 431 of the targeting arm 402 flush within the recessed portion 451. This stabilizes the longitudinal and lateral relationship between the targeting arm 402 and the stage-holding arm 401. The user then places the lower portion 448 of the dowel pin 447 into the indexing hole 449. The user then places the distal male threaded portion 441 of the tightening screw 438 adjacent the matching internal thread 450 in the stage-holding arm 401, and tightens the threaded portion 441 into the internal thread 450 to lock the targeting arm 402 to the stage-holding arm 401 in their intended relative positions. Turning to FIG. 29, the targeting arm 402 comprises an upper planar face 462 and a lower face 463. The upper planar face 462 is on the targeting portion 428, and provides first and second bone anchor targeting holes 464, 465, a leadscrew access hole 466, and an access hole 467, for accessing the proximal screw drive 416 of the tightening screw 414. Each of these holes 464, 465, 466, 467 passes completely through the targeting portion 428 in a substantially vertical direction. In alternative embodiments, one or more of the holes 464, 465, 466, 467 can comprise a counterbore and/or a tapered diameter. For example, a proximal (upper) portion of the hole can have a tapered lead-in for facilitated insertion of a bone anchor 308, 309 or a tightening/torquing tool. However, the holes 464, 465, 466, 467 typically have a close-fitting section having sufficient length and sufficient length-to-diameter ratio to accurately aim the bone anchor 308, 309 in the desired direction.

Figure 33:
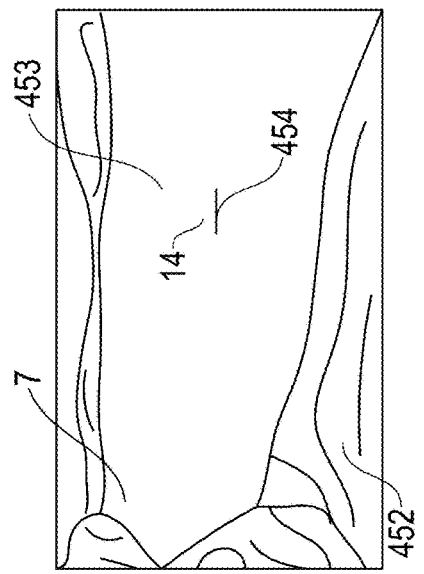
FIG. 33 is a plan view of a first step for preparing a patient for implantation of a periosteal distraction device, according to an embodiment of the present disclosure.
Figure 34:
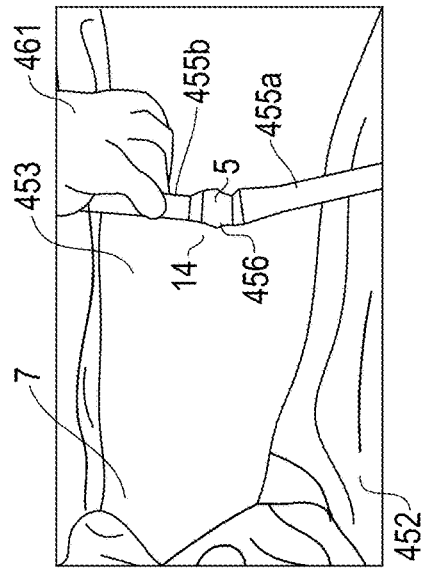
FIG. 34 is a plan view of a second step for preparing a patient for implantation of a periosteal distraction device, according to an embodiment of the present disclosure.
Figure 36:
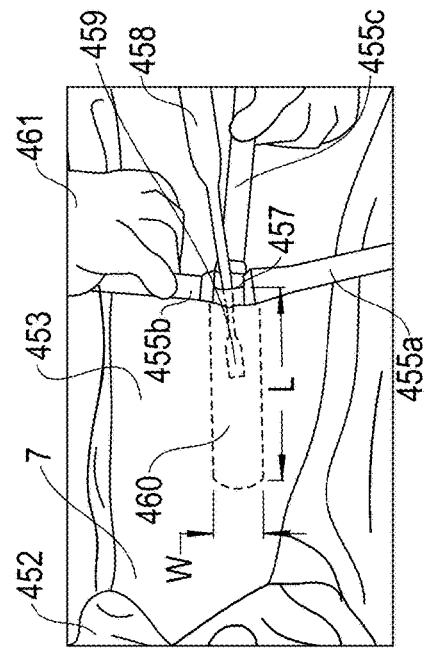
FIG. 36 is a plan view of a fourth step for preparing a patient for implantation of a periosteal distraction device, according to an embodiment of the present disclosure.
Figure 37:
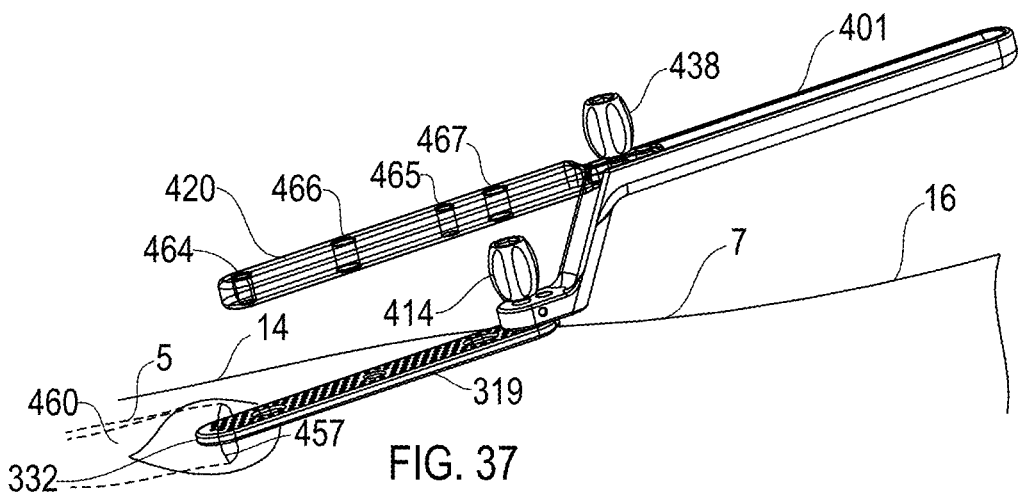
FIG. 37 is a perspective view of a movable stage being inserted utilizing an insertion tool, according to an embodiment of the present disclosure.

As shown in FIG. 37, the movable stage 319 is now ready for placement beneath the periosteum 5 of a patient 16. The steps of preparing a patient for implantation of the movable stage are shown in FIGS. 33-36. Surgical drapes 452 are placed around the operating area 453 of a lower leg 7 of a patient. In FIG. 33, a longitudinal incision 454 is made in the skin 14 of the patient 16 in the operating area 453, by use of a scalpel, or other cutting instrument. The incision 454 extends through subcutaneous fat and connective tissue between the skin 14 and the periosteum (e.g., tibia 1, as shown, or other bone). A typical length for the incision 454 can be approximately 20 mm. In FIG. 34, a user 461 utilizes surgical retractors 455a, 455b to retract the skin 14 to change longitudinal incision 454 to an opening 456, exposing the periosteum 5 that surrounds the tibia 1. In FIG. 35, a transverse incision 457 is made in the periosteum 5, by use of a scalpel, or other cutting instrument. A typical length for the incision 457 can be approximately 10 mm. An appropriate width is chosen in order to access the subsequent operations, as described. In FIG. 36, a periosteal elevator 458 having a separator tip 459 is used to separate the periosteum 5 from the tibia 1, and to create a longitudinal tunnel 460, for placement of the movable stage 319. One or more additional retractors 455c can be used by the user 461 or other personnel, if additional retraction is required. For example, the retraction can be in a longitudinal direction, such as an opposite direction of the advancement of the tip 459 of the periosteal elevator 458. The tunnel 460 has a width W and a length L that are large enough to allow insertion of the movable stage 319. The tunnel 460 can be made to be initially very small in terms of space away from the tibia 1, if substantial dissection is avoided. This allows for maximal stretchability of the periosteum 5. For example, when the incision 457 is made, the space can be less than the thickness of the movable stage 319 (e.g., distance between the upper surface 330 and the lower surface 331). Careful placement of the movable stage 319 into the tunnel 460 can cause minimal initial stretching. The width W and length L do not necessarily need to be wider and longer than the movable stage 319, for example, if the periosteum is able to stretch somewhat during insertion of the movable stage 319. Holes can be drilled in the near cortex of the tibia 1 at the site of the incisions 454, 457, to decompress the medullary cavity. In some cases, there may be four holes drilled with a 2 mm diameter drill bit. The holes can be placed at four corners of a square area. The tunnel 460 is shown in one embodiment in FIG. 36, wherein it substantially extends distally to the incisions 454, 457. However, the periosteal elevator 458 can be used bi-directionally (distal and proximal to the incisions 454, 457) such that the longitudinal center point of the tunnel 460 is at the incisions 454, 457. Thus, an additional center hole would not have to be made in the skin 14, because the center of the movable stage 319 would be accessible through the incisions 454, 457.

Figure 38:
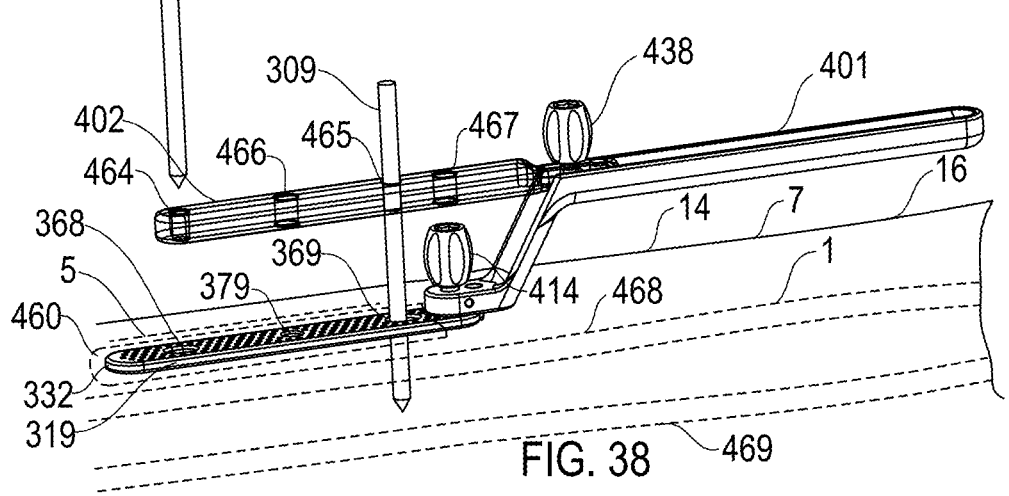
FIG. 38 is a perspective view of bone anchors being inserted through targeting holes in an insertion tool, according to an embodiment of the present disclosure.
Figure 39:
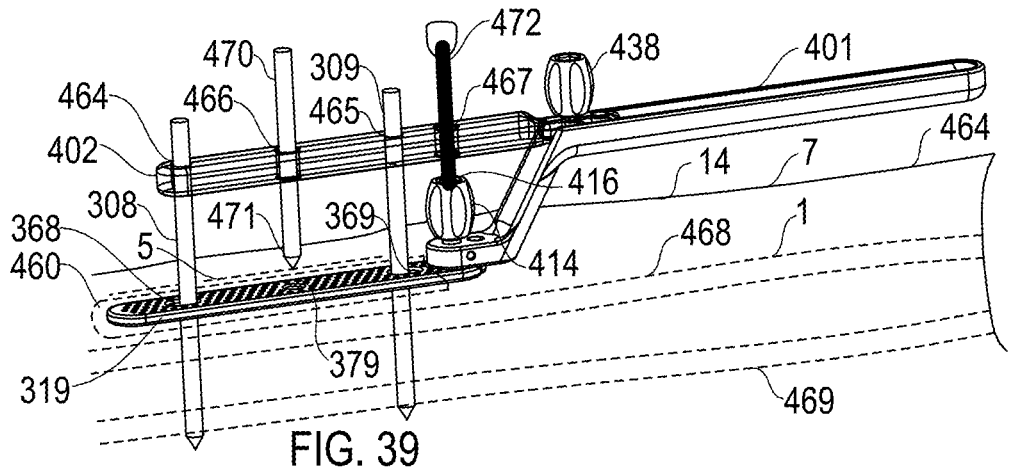
FIG. 39 is a perspective view of other preparation operations being performed through an insertion tool, according to an embodiment of the present disclosure.

As shown in FIG. 37, a user holds the handle 403 of the stage-holding arm 401, and inserts the first end 332 of the movable stage 319 into the transverse incision 457 in the periosteum 5. The user then advances the movable stage 319 into the longitudinal tunnel 460 until the movable stage 319 is substantially within the tunnel 460, as shown in FIG. 38. The bone anchor 309 is first passed through the proximal bone anchor hole 465 of the targeting portion 428 of the targeting arm 402, then either piercing the skin, or passing through a pre-made incision in the skin, then passed through the hole 369 in the movable stage 319, and then hammered or screwed into the near cortex 468 of the tibia 1, as shown in FIG. 38. FIG. 38 also shows a second bone anchor 308 about to be inserted through the distal bone anchor hole 464. FIG. 39 shows both bone anchors 308, 309 after they have been passed through the near cortex 468, and also the far cortex 469 of the tibia 1. In some cases, a user may decide to only secure one or both of the bone anchors 308, 309 only to the near cortex 468 and not the far cortex 469. FIG. 39 illustrates the distal attachment into the far cortex 469, using both bone anchors 308, 309. The distal bone anchor 308 is first passed through the proximal bone anchor hole 464 of the targeting portion 428 of the targeting arm 402, then either piercing the skin, or passing through a pre-made incision in the skin, then passed through the hole 368 in the movable stage 319, and then hammered or screwed into the near cortex 468 of the tibia 1, and/or the far cortex 469. The holes 464, 465 serve to accurately aim and target the holes 368, 369 in the movable stage 319. In alternative embodiments, a single bone anchor can be sufficient for securely and rigidly anchoring the base 301. In a subsequent step, the base 301 of the PD device 300 will be attached, and the leadscrew 320 will also be passed through the skin 14. FIG. 39 illustrates a puncturing tool 470 being passed through the leadscrew access hole 466 of the targeting portion 428, and making a puncture 471 in the skin 14 of the patient 16. The puncturing tool 470 is intended to make space for the leadscrew 420 in the correct direction, and thus creates a channel through the skin for the leadscrew 420 to pass toward the internal thread 379 in the movable stage 319, into which the external thread 380 of the leadscrew 320 can be threadingly engaged. After creating the puncture 471, the puncturing tool 470 can be removed. In some cases, an additional puncture in the skin 14 would not need to be made for the bone anchor 309, as it could extend through the incision 457.

Figure 40:
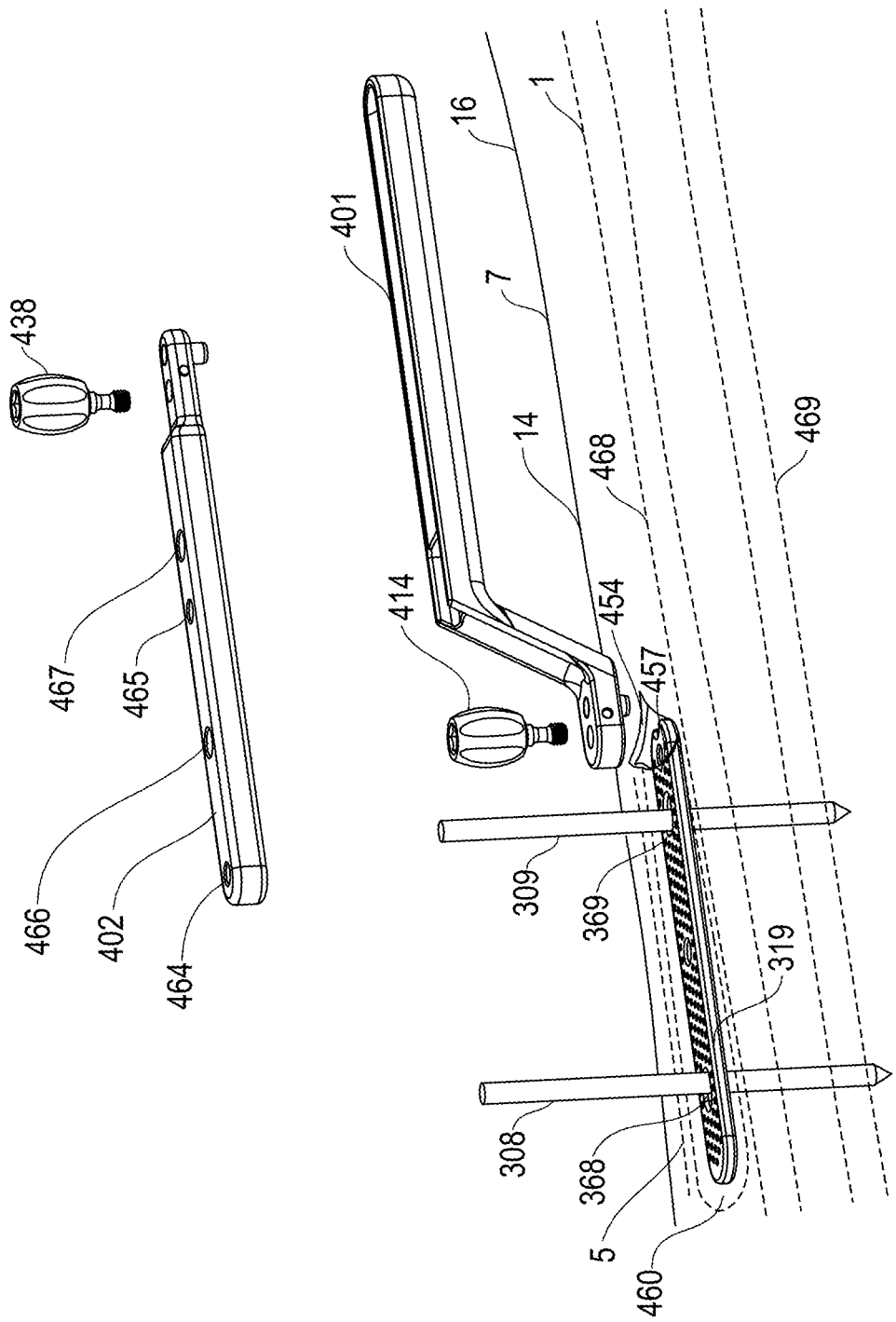
FIG. 40 is a perspective view of the disassembly and removal of an insertion tool, according to an embodiment of the present disclosure.

With the bone anchors 308, 309 secured in the tibia 1, and passing through the holes 368, 369 of the movable stage 319, which is within the tunnel 460, the insertion tool 400 can now be detached and removed. As illustrated in FIG. 39, the user places a torquing tool 472 through the access hole 467, which is aimed at the proximal screw drive 416 of the tightening screw 414. By turning the tip of the torquing tool in a keyed relationship with the screw drive 416, the user is able to substantially loosen or completely loosen and detach the tightening screw 414 from the internal thread 427 of the movable stage 319. Turning to FIG. 40, the user then loosens the tightening screw 438 and removes it and the targeting arm 402 from the stage-holding arm 401. The user also removes the tightening screw 414 and the stage-holding arm 401. The bone anchors 308, 309 and the movable stage 319 are now in their desired positions, the bone anchors 308, 309 in a static engagement with the bone (tibia 1) and the movable stage 319 translatable over the bone anchors 308, 309 via its holes 368, 369, to distract and stretch the periosteum 5 in relation to the bone 1, with at least a transverse component of motion.

Figure 41:
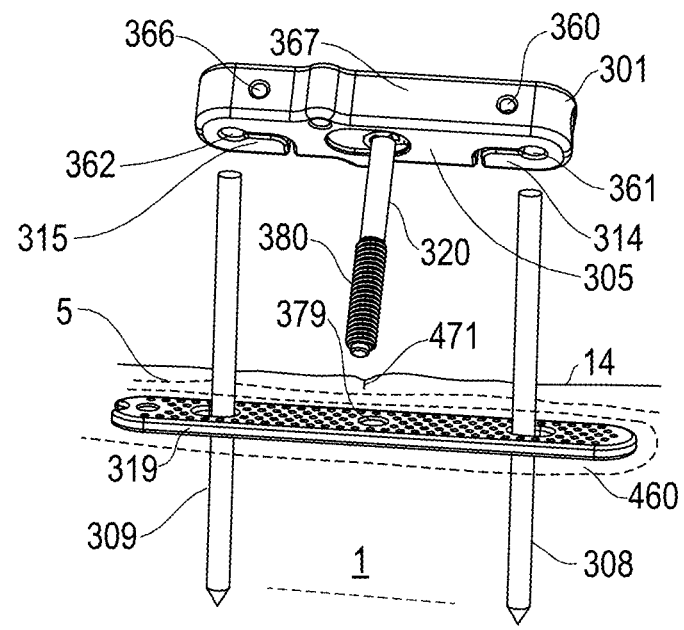
FIG. 41 is a perspective view of a periosteal distraction device body and leadscrew being prepared for coupling with bone anchors and a movable stage, according to an embodiment of the present disclosure.
Figure 42:
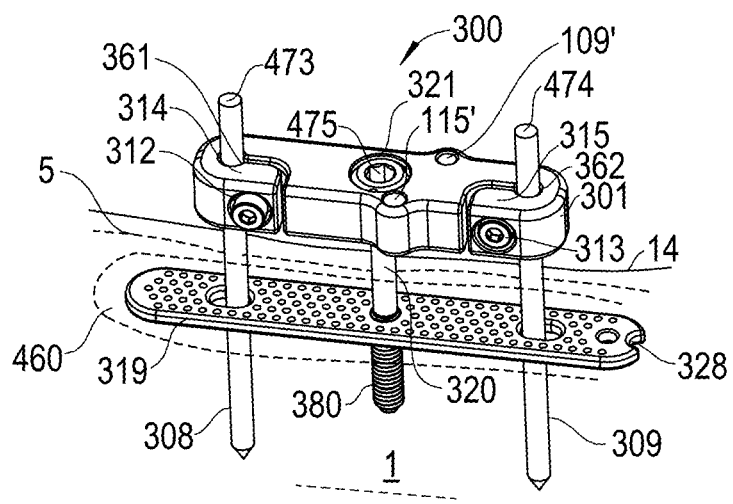
FIG. 42 is a perspective view of a body of a periosteal distraction device being secured to bone anchors, according to an embodiment of the present disclosure.

Turning to FIG. 41, the user readies the base 301 of the PD device 300 for attachment to the bone anchors 308, 309 and the movable stage 319 (via the leadscrew 320) by assuring that the set screws 312, 313 are loosened. The user aligns hole 362 of the base 301 of the PD device 300 with a top end 473 of the bone anchor 309, aligns hole 361 of the base 301 of the PD device 300 with a top end 474 of the bone anchor 308, and inserts or aligns the distal cylindrical projection 386 of the leadscrew 320 for passage through the puncture 471 in the skin 14 of the patient 16. While pushing the leadscrew 320 through the puncture 471, the user slides the base 301 down so that the lower surface 305 of the base 301 approaches the skin 14. As mentioned, they can contact each other, or have a spec between them, or a soft material, such as gauze (cotton 4×4, etc.). The user places a torque tool into a screw drive 475 in the head 321 of the leadscrew 320 and turns the leadscrew 320 in a first direction that engages with the internal thread 379 of the movable stage 319 to place the PD device 300 in the position of FIG. 31, or a further distracted position that represents a starting position. Finally, with the base 301 in the desired position and the leadscrew 320 engaged with the movable stage 319, the user tightens a set screw 313 (as shown in FIG. 42) to engage the base 301 with the bone anchor 309. The user also does this with the set screw 312 to engage the base 301 with the bone anchor 308 (shown in process in FIG. 42). The PD device 300 is now ready to distracting and stretching the periosteum 5 by either manual rotation of the leadscrew 320, or by attachment of a modular drive unit 102 for automatic distraction. Hole 115' is similar to hole 115 of the base 201, and female threaded hole 109' is similar to female threaded hole 109 of the base 201 (FIG. 7), and both holes operate similarly for coupling with the modular drive unit 102. Wax can be placed into the screw drive 475 to protect its interior form dirt or other soiling until a distraction procedure. The periosteum 5 and skin 14 can now be sutured at the incisions 457, 454.

Figure 43:
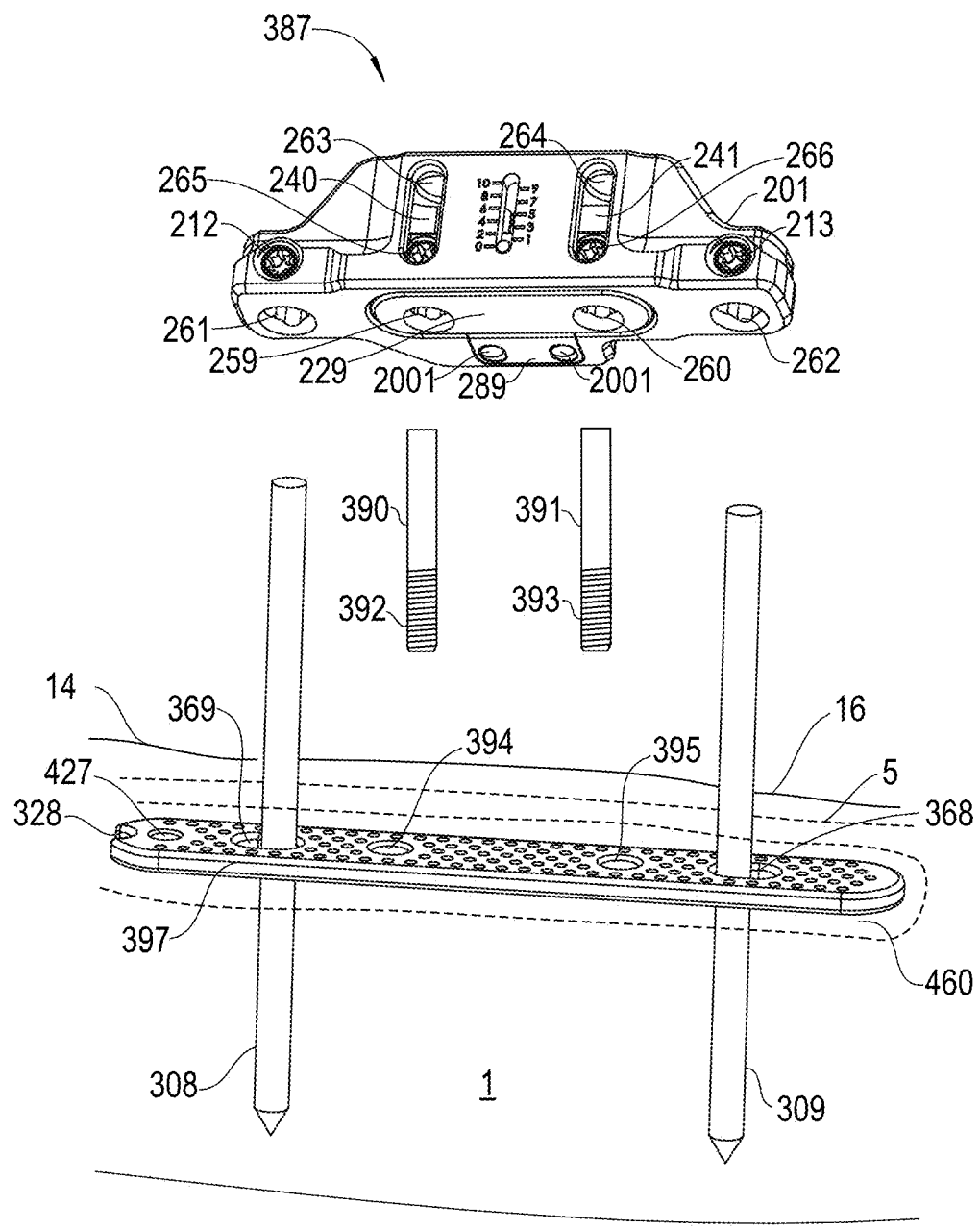
FIG. 43 is a perspective view of an alternative periosteal distraction device incorporating the base of FIGS. 7-8, being implanted within a patient, according to an embodiment of the present disclosure.

FIG. 43 illustrates an alternative periosteal distraction device (PD device) 387 that utilizes the base 201 of the transverse tibia transport device (TTT device) 200 along with the bone anchors 308, 309 and a movable stage 397, that is similar to the movable stage 319, but includes a different threaded hole configuration. The bone anchors 308, 309 and the movable stage 397 are shown in FIG. 43 after having been implanted in a patient 16 using the procedures described in relation to FIGS. 33-38. Hole 261 in the base 201 is configured to be placed over the proximal end of bone anchor 308 and secured via set screw 212. Hole 262 in the base 201 is configured to be placed over the proximal end of bone anchor 309 and secured via set screw 213. However, the movable stage 397 for distraction/stretching of the periosteum 5 is coupled to the movable stage 229 via dynamic screws 390, 391. The screws 390, 391 include distal threaded portions 392, 393 that are configured to threadlingly secure to internal threadings 394, 395 that pass through the movable stage 397. The screws 390, 391 are placed into holes 259, 260 of the movable stage 229, respectively, and are secured via the set screws 265, 266, respectively. The normal translation of the movable stage 229 of the TTT device 200 is thus configured to move in unison with the movable stage 397 (plate). The TTT device 200 has thus been transformed into a periosteal distraction device (PD device) 387.

Figure 9:
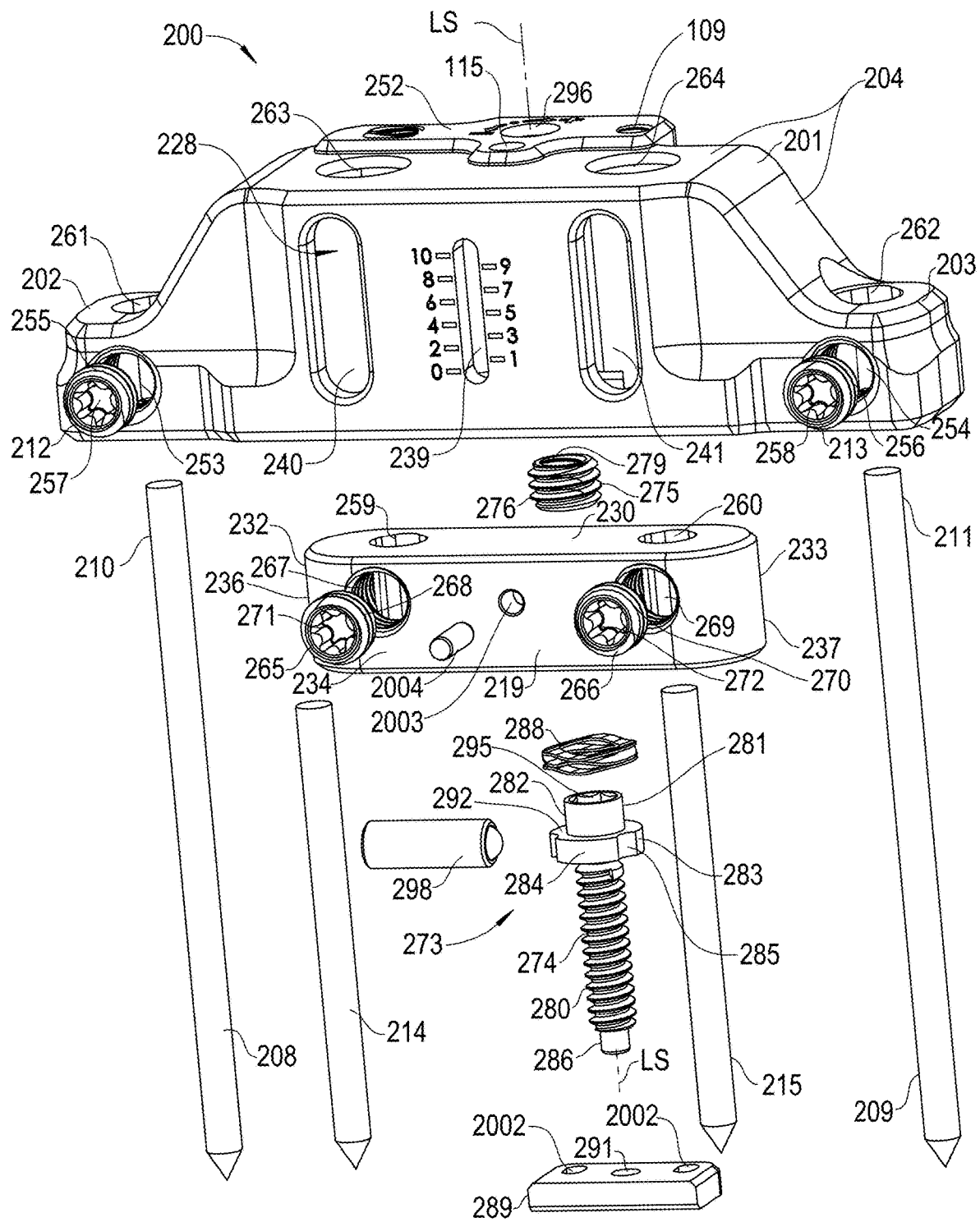
FIG. 9 is an exploded view of the transverse transport device of FIG. 7.
Figure 10:
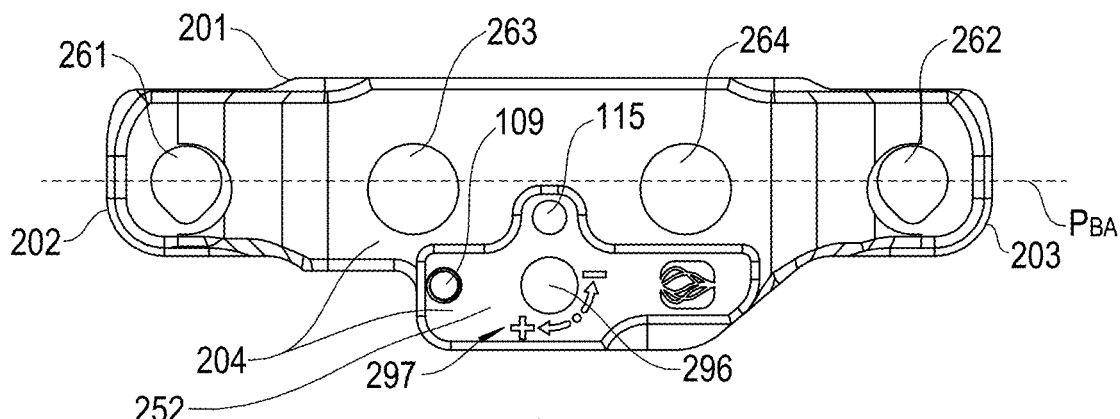
FIG. 10 is a top view of the base of the transverse transport device of FIG. 7.
Figure 11:
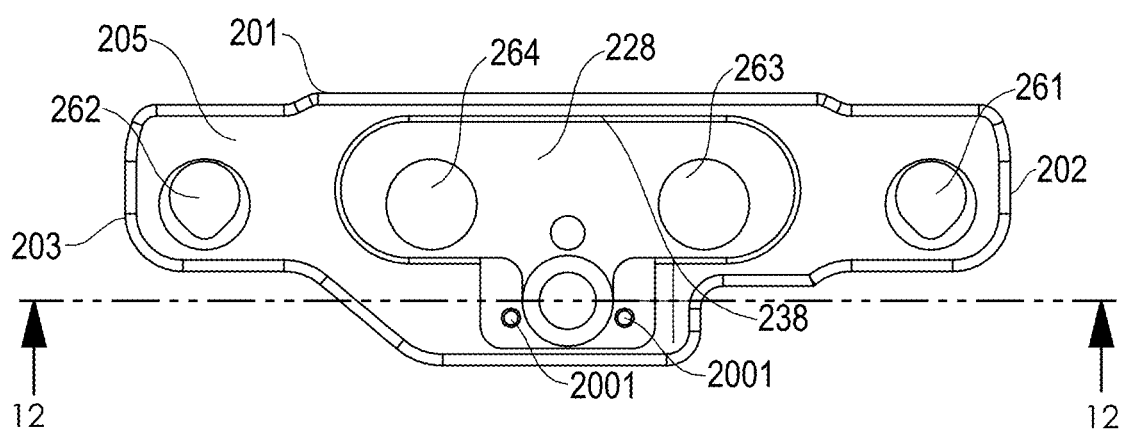
FIG. 11 is a bottom view of the base of the transverse transport device of FIG. 7.
Figure 44:
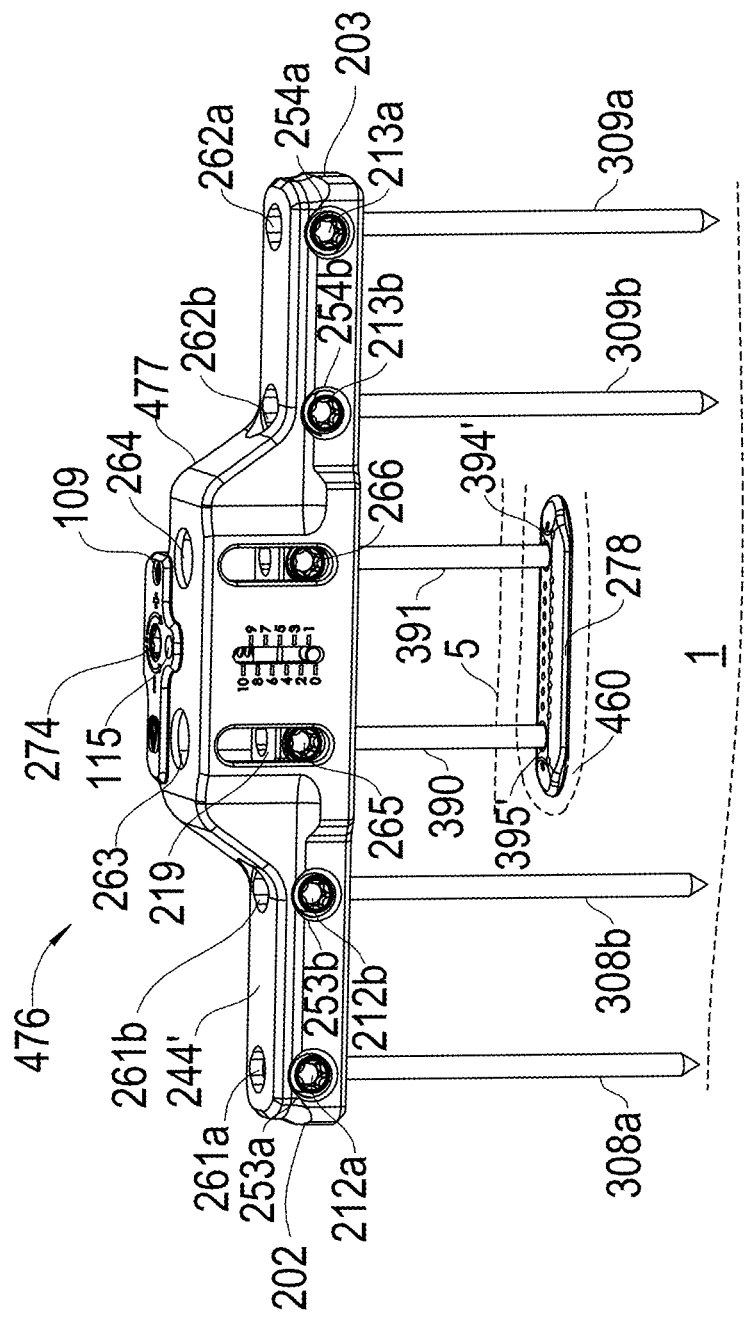
FIG. 44 is a perspective view of an alternative periosteal distraction device implanted within a patient, according to an embodiment of the present disclosure.

FIG. 44 illustrates an alternative periosteal distraction device (PD device) 476 that utilizes a base 477 that is similar to the base 201 of FIGS. 9 and 43, except that a first reduced-thickness end portion 244' and a second reduced-thickness portion 245' are further longitudinally elongated, such that they each provide two holes for static bone anchors 308*a*-*b* or 309*a*-*b*. The first reduced-thickness end portion 244' includes holes 261*a*, 261*b* and the second reduced-thickness end portion 245' includes holes 262*a*, 262*b*. Furthermore, the first reduced-thickness end portion 244' comprises two female-threaded holes 253*a*, 253*b* configured to threadingly engage male threads 255*a*, 255*b* of two set screws 212*a*, 212*b*. And, the second reduced-thickness end portion 245' comprises two female-threaded holes 254*a*, 254*b* configured to threadingly engage male threads 256*a*, 256*b* of two set screws 213*a*, 213*b*. The movable stage 478 (distraction plate) has a relatively short length in comparison to the base 477 (e.g., between 20 mm and 60 mm, or between 30 mm and 50 mm or about 40 mm). The relatively short length allows the distraction plate 478 to fit between the static bone anchors 308*a*-*b*, 309*a*-*b*, and thus not require the clearance holes 368, 369 of the movable stage plate 397 of FIG. 43. The internal threadings 394', 395' are similar to the internal threadings 394, 395 of the movable stage plate 397 of FIG. 43, and are configured to be threadingly secured to the distal threaded portions 392, 393 of the dynamic screws 390, 391.

Figure 45:
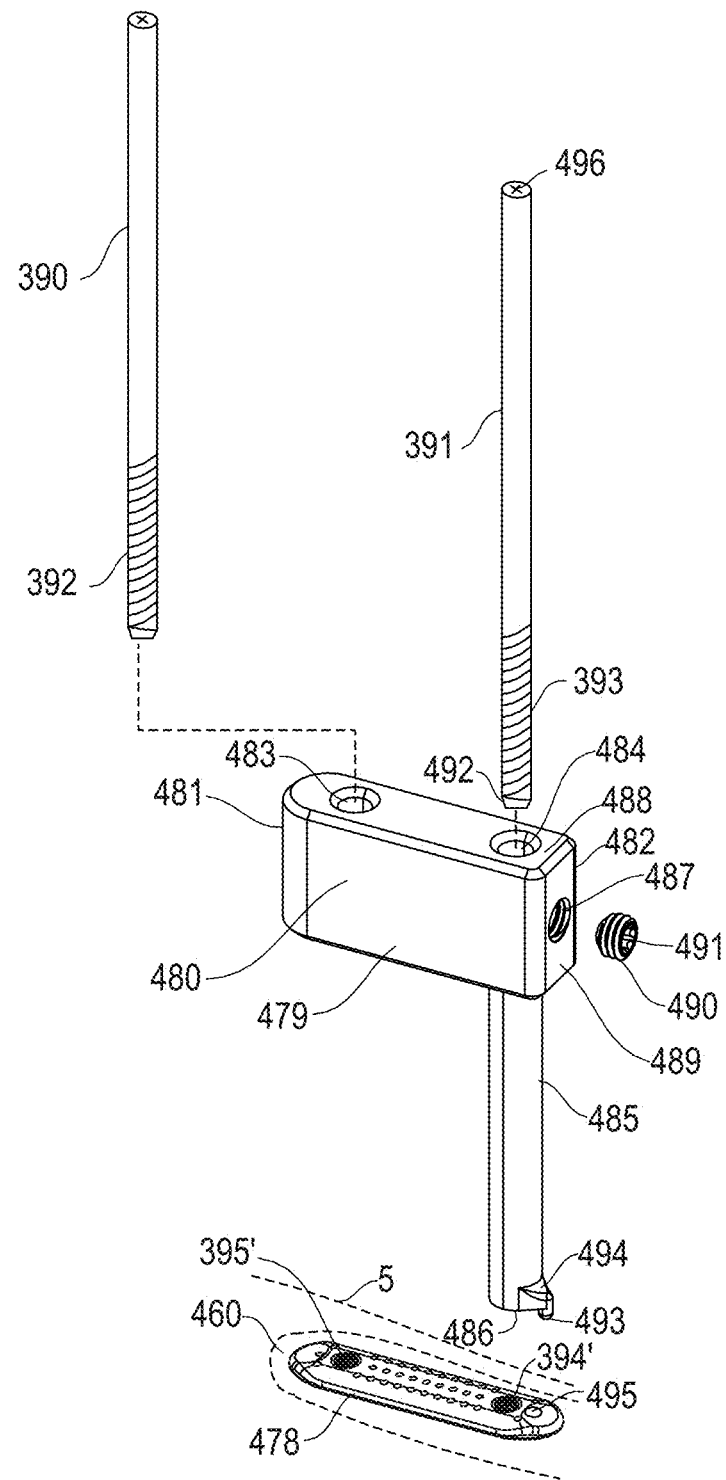
FIG. 45 is an exploded view of a targeting tool used with the periosteal distraction device of FIG. 44 in an insertion procedure, according to an embodiment of the present disclosure.

Turning to FIG. 45, a targeting tool 479 is used, instead of the targeting arm 402, to target, pass, and secure the dynamic screws 390, 391 to the internal threadings 394', 395' of the movable stage 478. The targeting tool 479 comprises a longitudinally-extending body 480 having a first end 481 and a second end 482. At the first end 481 is a transversely-extending through hole 483 configured to closely pass one of the dynamic screws 390, and at the second end 482 is a transversely-extending through hole 484 that is configured to closely pass the other of the dynamic screws 391, and extends further through an extension tube 485 and exits out an end exit 486. Perpendicular to the hole 484, a threaded hole 487 passes completely through a wall 488 between a side face 489 of the longitudinally-extending body 480 and the hole 484. A set screw 490 having a screw drive 491 is configured to threadingly engage with the threaded hole 487 and to tighten against and secure the dynamic screw 391. In use, after the movable stage 478 has been placed into the tunnel 460, the dynamic screw 391 is inserted through the hole 484 until a distal end 492 of the dynamic screw 391 extends from the end exit 486. The set screw 490 is then tightened to the dynamic screw 391 with a torquing tool, making it static in relation to the targeting tool 479. The targeting tool 479 further includes a transversely-extending circular protrusion 493 that is radially offset from the hole 484 via a side projection 494. The movable stage 478 includes an indexing hole 495 that is configured to closely fit the diameter of the protrusion 493.

In other embodiments, the protrusion 493 and the indexing hole 495 each have a common non-circular shape, configured to closely fit each other. A puncture or incision is made in the skin 14, or previous incisions or punctures are used, and the extension tube 485/dynamic screw 391 is inserted through it/them until a lead-in (e.g., tapered) portion of the distal end 492 of the dynamic screw 391 begins to engage with the internal threading 394' of the movable stage 478 and the protrusion 493 engages with the indexing hole 495. The targeting tool 479 can be rotated accordingly to allow for engagement of both the distal end 492 portion and the protrusion 493 are in the correct positions. The user then engages a screw drive 496 of the dynamic screw 391 with a torquing tool and tightens the distal threaded portion 393 into the internal threading 394'.

The user then passes the dynamic screw 390 through the hole 483 and tightens the distal threaded portion 392 into the internal threading 395'. The previous engagement of the dynamic screw 391 with the movable stage 478 and/or the length-to-diameter ratio of the hole 483 allow the dynamic screw 391 to correctly target and engage the internal threading 395'. The user can now loosen the set screw 490 and remove the targeting tool 479. The base 477 can now be placed onto the bone anchors 308a-b, 309a-b and the dynamic screws 390, 391 and secured with set screws 212a-b, 213a-b, 265, 266, similar to the techniques described in relation to FIGS. 41-42 and FIG. 43. The PD device 476 is now ready to distracting and stretching the periosteum 5 by either manual rotation of the leadscrew 274, or by attachment of a modular drive unit 102 for automatic distraction. Wax can be placed into the non-circular cavity 295 (screw drive) to protect its interior from dirt or other soiling until a distraction procedure. The periosteum 5 and skin 14 can now be sutured at the incisions 457, 454.

While the foregoing is directed to embodiments of the present disclosure, other and further embodiments may be devised without departing from the basic scope thereof.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

For purposes of the present disclosure and appended claims, the conjunction "or" is to be construed inclusively (e.g., "an apple or an orange" would be interpreted as "an apple, or an orange, or both"; e.g., "an apple, an orange, or an avocado" would be interpreted as "an apple, or an orange, or an avocado, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open-ended terminology, with the same meaning as if the phrase "at least" were appended after each instance thereof.

What is claimed is:

1. A transport device for increasing biological activity, comprising:
    a base configured to be carried externally to skin of a subject;
    two or more base anchors configured to be coupled to the base and configured to statically couple the base to cortex of a bone of a subject;
    a translatable interface configured to engage an internal portion of the subject;
    a leadscrew dynamically coupling the base to the translatable interface, wherein the leadscrew is configured to rotate about a leadscrew axis while substantially maintaining its longitudinal position along the leadscrew axis in relation to the base, such that the translatable interface is capable of independent movement in relation to the base along the leadscrew axis;
    a screw drive rotatably coupled to the leadscrew and configured to couple to a rotatable mating tool that is configured to rotate the leadscrew via the screw drive, wherein the leadscrew is coupled to the base independently from the coupling of the two or more base anchors, and wherein the leadscrew comprises a head having an outer perimeter, the outer perimeter comprising a structural feature; and
    an engagement feature carried by the base, wherein physical reaction between the structural feature and the engagement feature when the leadscrew is moved between an engaged position and a disengaged position produces a physical disturbance configured to be sensed by a user via an audible and/or tactile vibration, to provide information to the user related to an extent of relative displacement between the translatable interface and the base.

2. The transport device of claim 1, wherein the two or more base anchors comprise bone screws configured to pass through skin of the subject.

3. The transport device of claim 1, wherein the translatable interface comprises one or more translatable bone anchors.

4. The transport device of claim 3, further comprising:
    a translatable platform comprising a female thread configured to be threadingly coupled to a male thread of the leadscrew to enable the translatable platform to be moved in relation to the base via rotation of the leadscrew, wherein the translatable platform is configured to be statically coupled to the one or more translatable bone anchors.

5. The transport device of claim 1, wherein the translatable interface comprises a plate configured to engage an underside of periosteum covering the bone of the subject.

6. The transport device of claim 5, further comprising:
    a translatable platform comprising a female thread configured to be threadingly coupled to a male thread of the leadscrew to enable the translatable platform to be moved in relation to the base via rotation of the leadscrew, wherein the translatable platform is configured to be statically coupled to the plate.

7. The transport device of claim 1, wherein the two or more base anchors are each configured to engage the cortex of the bone.

8. The transport device of claim 1, wherein the two or more base anchors are each configured to threadingly engage the cortex of the bone.

9. The transport device of claim 1, wherein the leadscrew comprises a threaded shaft.

10. The transport device of claim 9, wherein the entirety of a threaded shaft of the leadscrew is configured to be maintained between an upper surface and a lower surface of the base.

11. The transport device of claim 1, wherein the base is configured to be carried adjacent to the skin of the subject.

12. The transport device of claim 1, wherein the screw drive comprises a non-circular cavity or non-circular protuberance at an end of the leadscrew and configured to remain between a lower surface of the base and a region adjacent to an upper surface of the base.

13. The transport device of claim 1, wherein a rotational torque required to move the leadscrew from the engaged position to the disengaged position, without any additional external load on the leadscrew, is between about 10 N-mm and about 1000 N-mm.

14. The transport device of claim 1, wherein the base is configured to be statically coupled to a standard external fixator frame.

15. The transport device of claim 1, wherein the leadscrew is substantially maintained within physical limits of the base, and further comprising:
a bias abutting one end of the leadscrew to provide at least some longitudinal force against the leadscrew during its rotation.

16. A transport device for increasing biological activity, comprising:
a base configured to be carried externally to and adjacent to skin of a subject;
a first base anchor comprising a first end configured to directly couple to the base and a second end configured to statically couple the base to cortex of a bone of a subject, the first base anchor configured to pass through skin of the subject;
a translatable interface configured to engage tissue of the subject;
a leadscrew dynamically coupling the base to the translatable interface, wherein the leadscrew is configured to rotate about a leadscrew axis while substantially maintaining its longitudinal position along the leadscrew axis in relation to the base, such that the translatable interface is capable of movement in relation to the base along the leadscrew axis;
a screw drive rotatably coupled to the leadscrew and configured to couple to a rotatable mating tool that is configured to rotate the leadscrew via the screw drive, wherein the leadscrew is coupled to the base independently from the coupling of the first base anchor, wherein the leadscrew comprises a head having an outer perimeter, the outer perimeter comprising a structural feature; and
an engagement feature carried by the base, wherein physical reaction between the structural feature and the engagement feature when the leadscrew is moved between an engaged position and a disengaged position produces a physical disturbance configured to be sensed by a user via an audible and/or tactile vibration, to provide information to the user related to an extent of relative displacement between the translatable interface and the base.

17. The transport device of claim 16, further comprising:
a second base anchor comprising a first end configured to directly couple to the base and a second end configured to statically couple the base to cortex of a bone of a subject, the second base anchor configured to pass through skin of the subject, wherein the leadscrew is coupled to the base independently from the coupling of the second base anchor.

18. The transport device of claim 16, wherein the translatable interface comprises one or more translatable bone anchors.

19. The transport device of claim 18, further comprising:
a translatable platform comprising a female thread configured to be threadingly coupled to a male thread of the leadscrew to enable the translatable platform to be moved in relation to the base via rotation of the leadscrew, wherein the translatable platform is configured to be statically coupled to the one or more translatable bone anchors.

20. The transport device of claim 16, wherein the translatable interface comprises a plate configured to engage an underside of periosteum covering the bone of the subject.

21. The transport device of claim 20, further comprising:
a translatable platform comprising a female thread configured to be threadingly coupled to a male thread of the leadscrew to enable the translatable platform to be moved in relation to the base via rotation of the leadscrew, wherein the translatable platform is configured to be statically coupled to the plate.

22. The transport device of claim 16, wherein the first base anchor is configured to engage the cortex of the bone.

23. The transport device of claim 16, wherein the first base anchor is configured to threadingly engage the cortex of the bone.

24. The transport device of claim 16, wherein the leadscrew comprises a threaded shaft.

25. The transport device of claim 24, wherein the entirety of a threaded shaft of the leadscrew is configured to be maintained between an upper surface and a lower surface of the base.

26. The transport device of claim 16, wherein the base is configured to be statically coupled to a standard external fixator frame.

27. The transport device of claim 16, wherein the leadscrew is substantially maintained within physical limits of the base, and further comprising:
a bias abutting one end of the leadscrew to provide at least some longitudinal force against the leadscrew during its rotation.

* * * * *